United States Patent [19]

Schaumburg et al.

[11] Patent Number: 4,583,286

[45] Date of Patent: Apr. 22, 1986

[54] APPARATUS AND METHOD FOR PROCESSING AND TRANSFERRING BATTERY CELL ELEMENTS

[75] Inventors: Edward G. Schaumburg, Askov; Peter A. Recht, Minneapolis; Mark R. Frich, Maplewood, all of Minn.

[73] Assignee: GNB Batteries Inc., Mendota Heights, Minn.

[21] Appl. No.: 479,491

[22] Filed: Mar. 28, 1983

[51] Int. Cl.[4] .............................................. B23P 19/00
[52] U.S. Cl. ........................................ 29/730; 29/731
[58] Field of Search .................................... 29/730, 731

[56] References Cited

U.S. PATENT DOCUMENTS

| | | | |
|---|---|---|---|
| 1,911,930 | 5/1933 | Schultze | 198/31 |
| 2,307,769 | 1/1943 | Deibel | 136/111 |
| 2,851,146 | 9/1958 | Sherrill | 198/31 |
| 3,050,173 | 8/1962 | Wimmer | 198/20 |
| 3,085,501 | 4/1963 | Wimmer | 100/4 |
| 3,309,071 | 3/1967 | Federici | 263/8 |
| 3,476,231 | 11/1969 | Bower | 198/19 |
| 3,510,120 | 5/1970 | Harris | 270/58 |
| 3,522,942 | 8/1970 | Hepp | 270/55 |
| 3,747,737 | 7/1973 | Brooke | 198/31 |
| 3,813,024 | 5/1974 | Kirchberger | 228/58 |
| 4,016,638 | 4/1977 | Klein | 29/730 |
| 4,029,194 | 6/1977 | Feurstein et al. | 198/358 |
| 4,074,423 | 2/1978 | DiGiacomo et al. | 29/730 |
| 4,178,118 | 12/1979 | Bailey | 414/28 |
| 4,203,694 | 5/1980 | James | 414/28 |
| 4,314,403 | 2/1982 | Sanekata | 29/730 |
| 4,351,106 | 9/1982 | Brady | 29/730 |
| 4,479,300 | 10/1984 | Savage | 29/730 |

Primary Examiner—Donald L. Walton
Attorney, Agent, or Firm—Augustus J. Hipp; Dennis R. Schlemmer

[57] ABSTRACT

A system for assembling, processing and transferring battery cell elements including a plurality of element assemblers and an exit conveyor having a plurality of element conveying lanes. Each element assembler includes element transfer and processing apparatus comprising an endless chain conveyor having a plurality of longitudinally spaced element carriers adapted to successively engage an element at a loading station, carry the engaged element through a plurality of process stations, and release the element at a discharge station. In the illustrated apparatus, the carriers each engage a loosely assembled element at the loading station, compress the element to final size, and carry the element through an inspection and manual unload station, a plate alignment station, a plate lug brushing station, a plate alignment after brushing station, and a series of tape applicator stations which bind the element in assembled and processed condition. The discharge station of each element assembler includes a transfer mechanism adapted to transfer assembled elements onto a selected one of a plurality of exit conveyor lanes in a manner that enables a uniform supply of elements for subsequent use in an automated battery production line.

48 Claims, 36 Drawing Figures

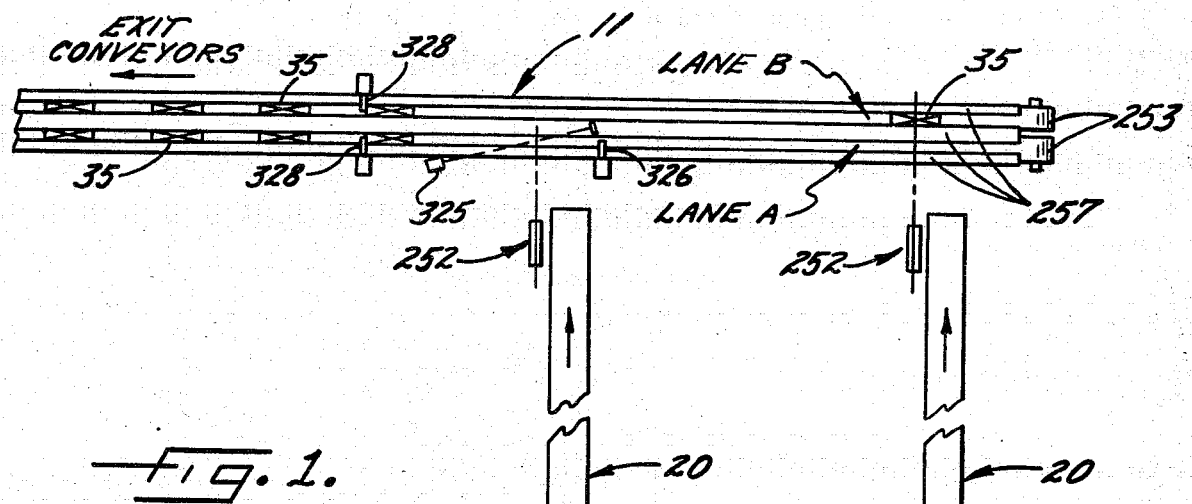
Fig. 1.
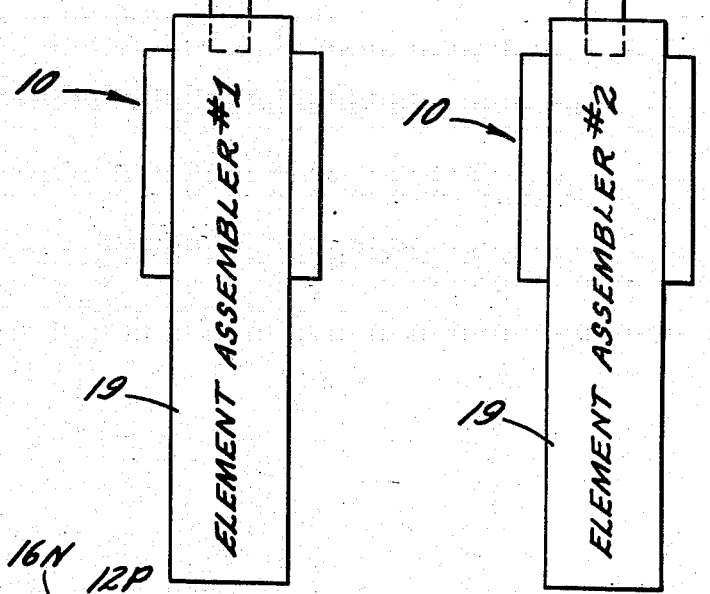
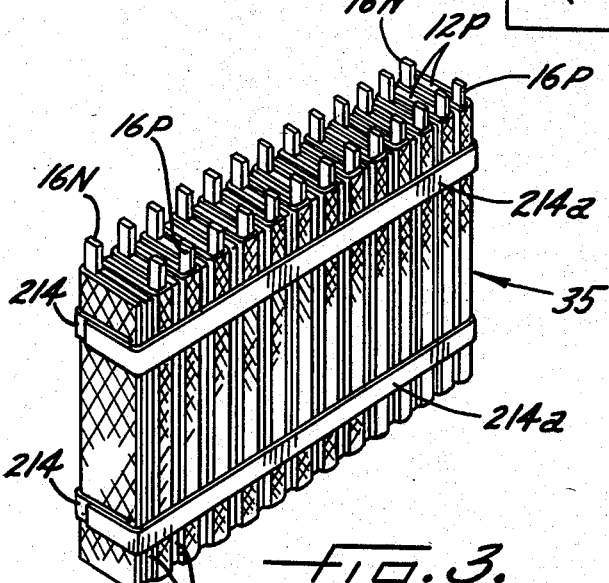
Fig. 3.
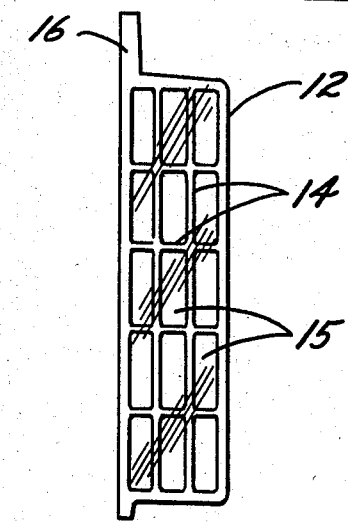
Fig. 4.

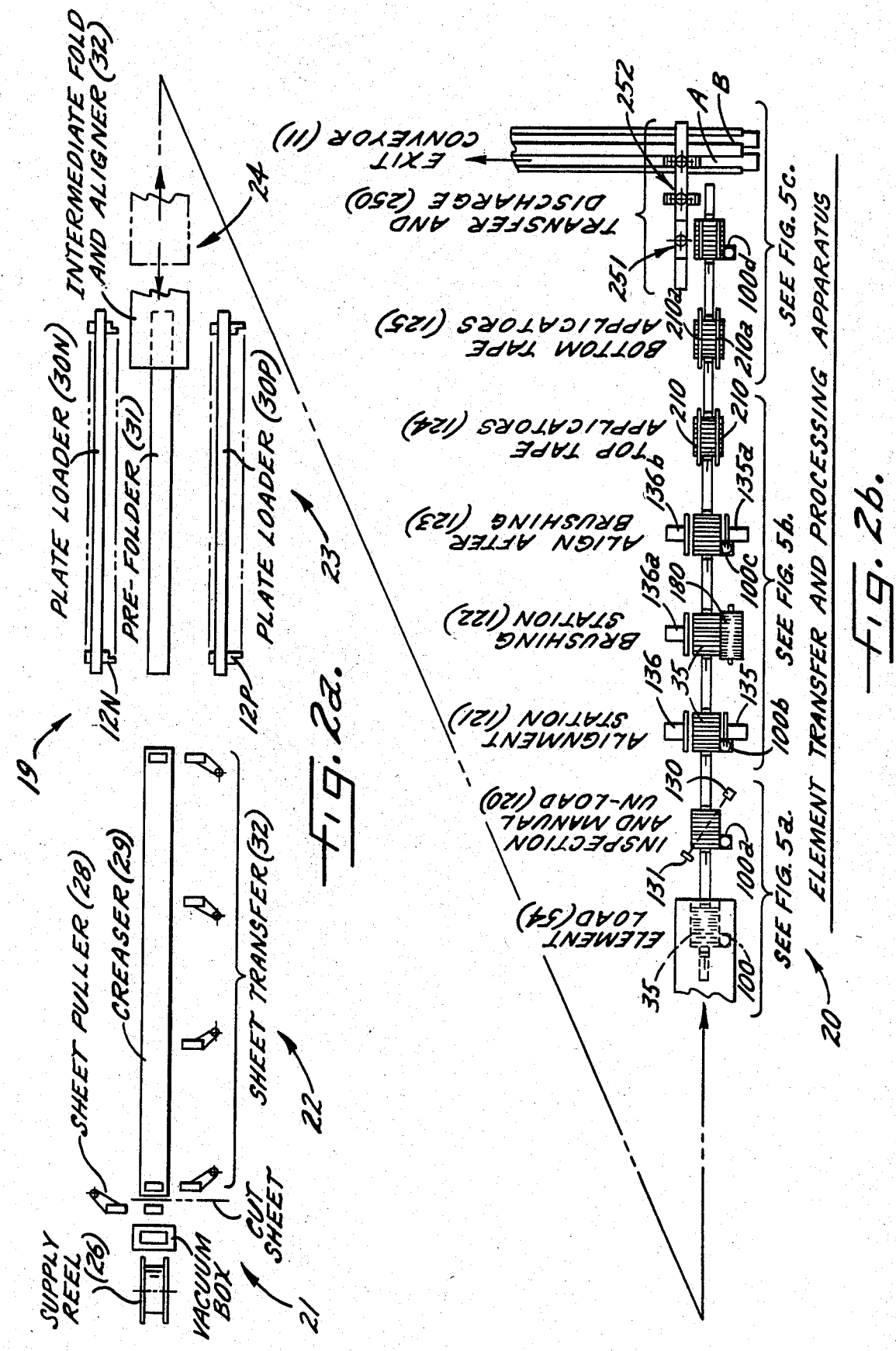

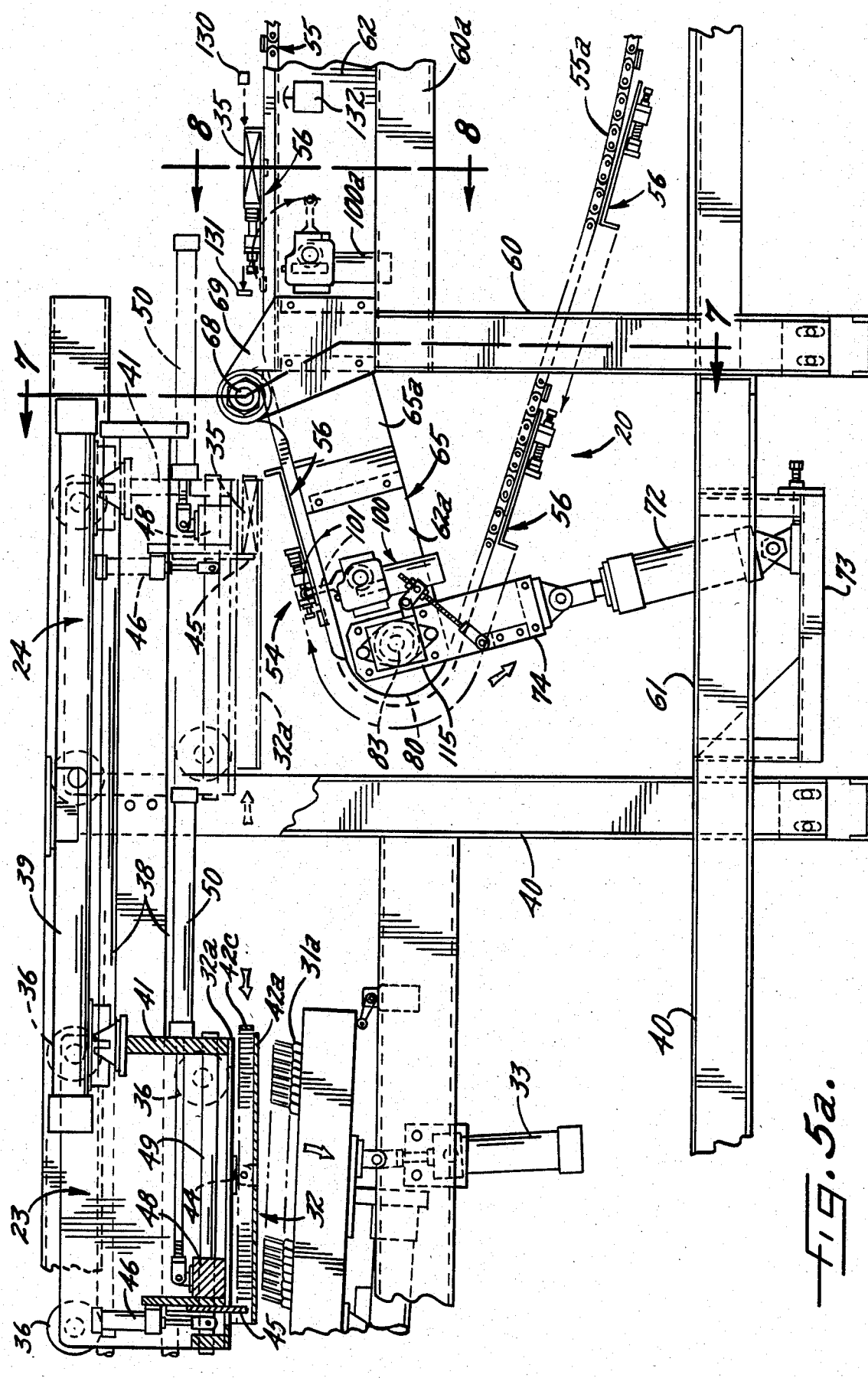

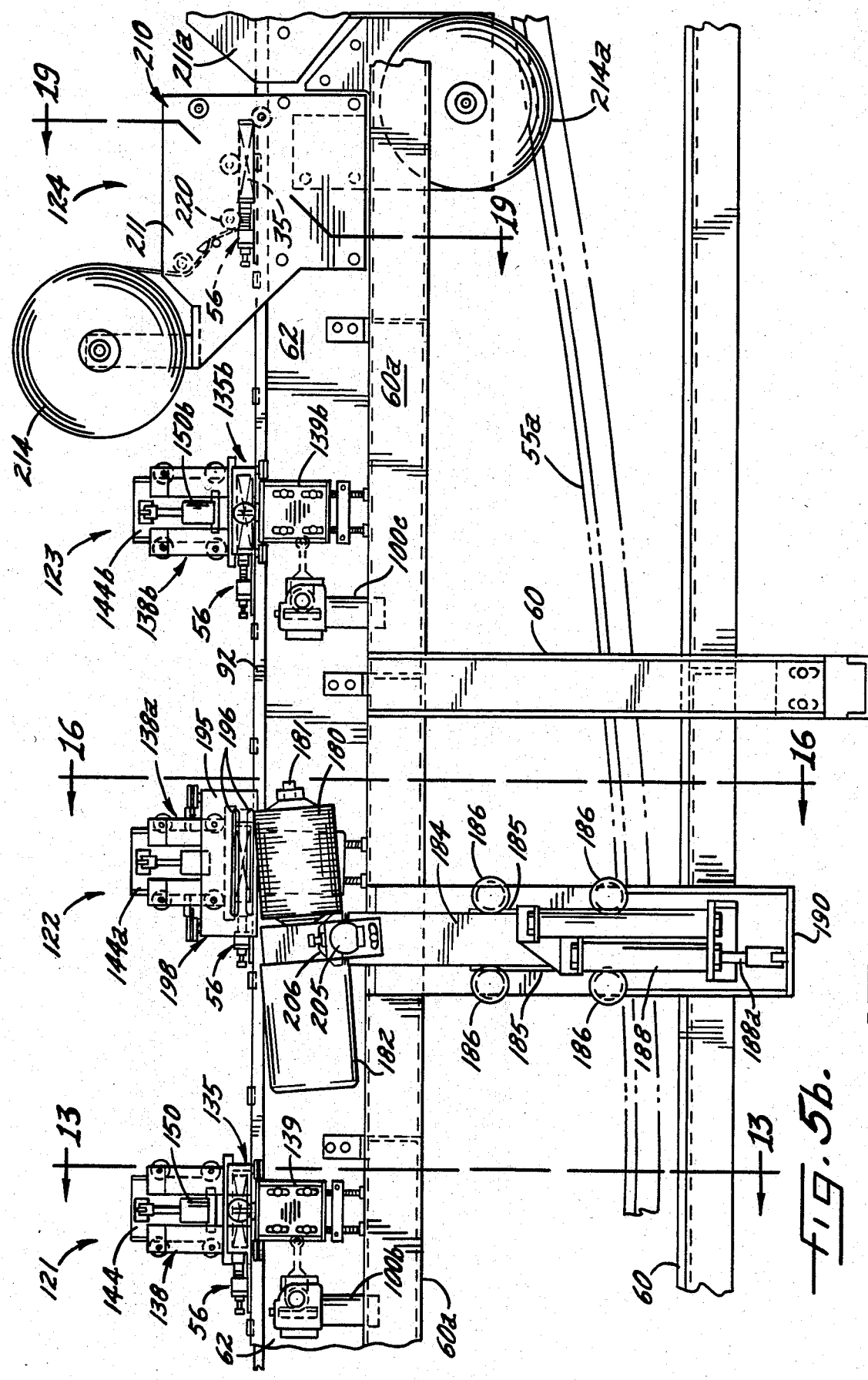

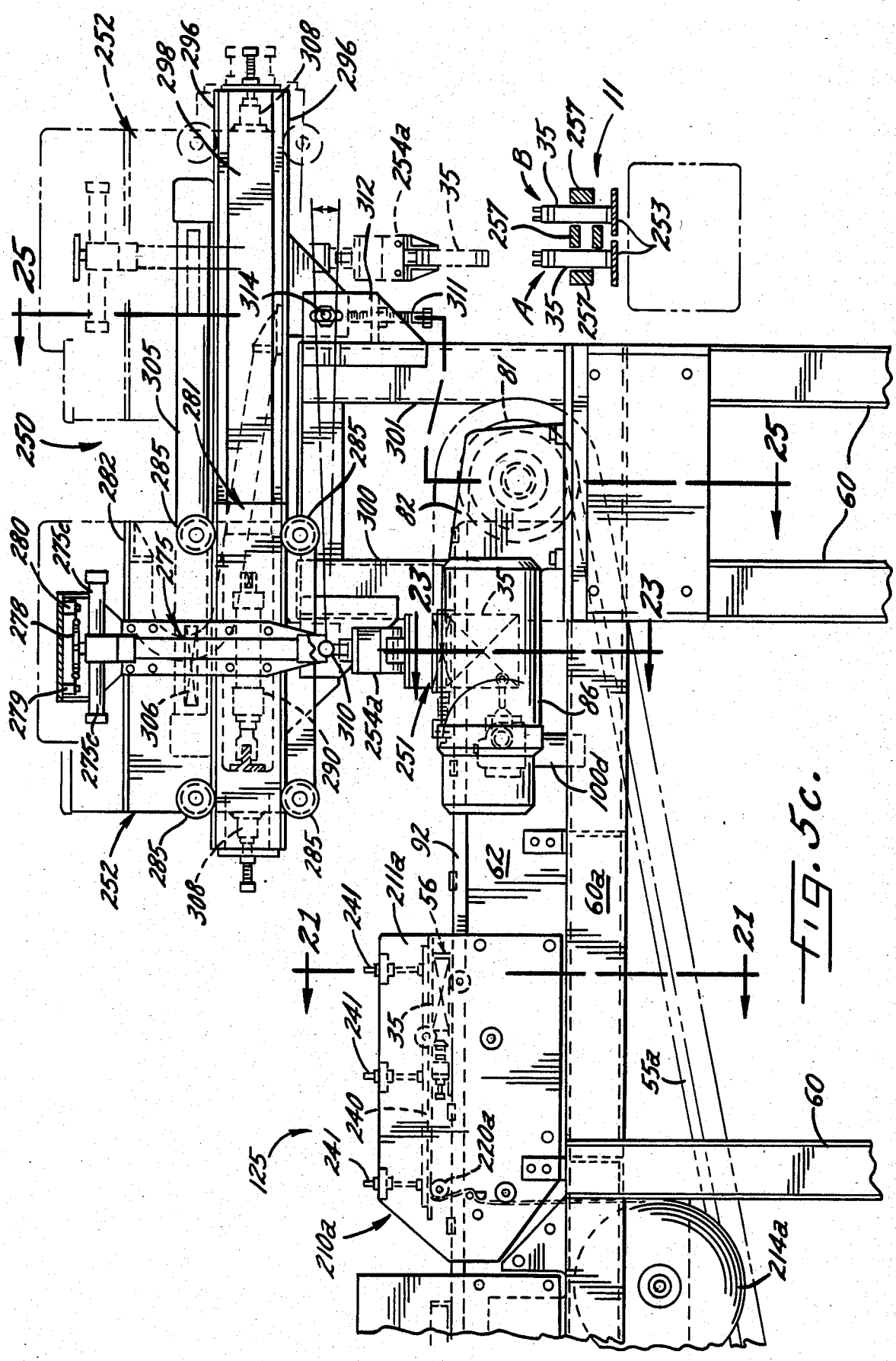

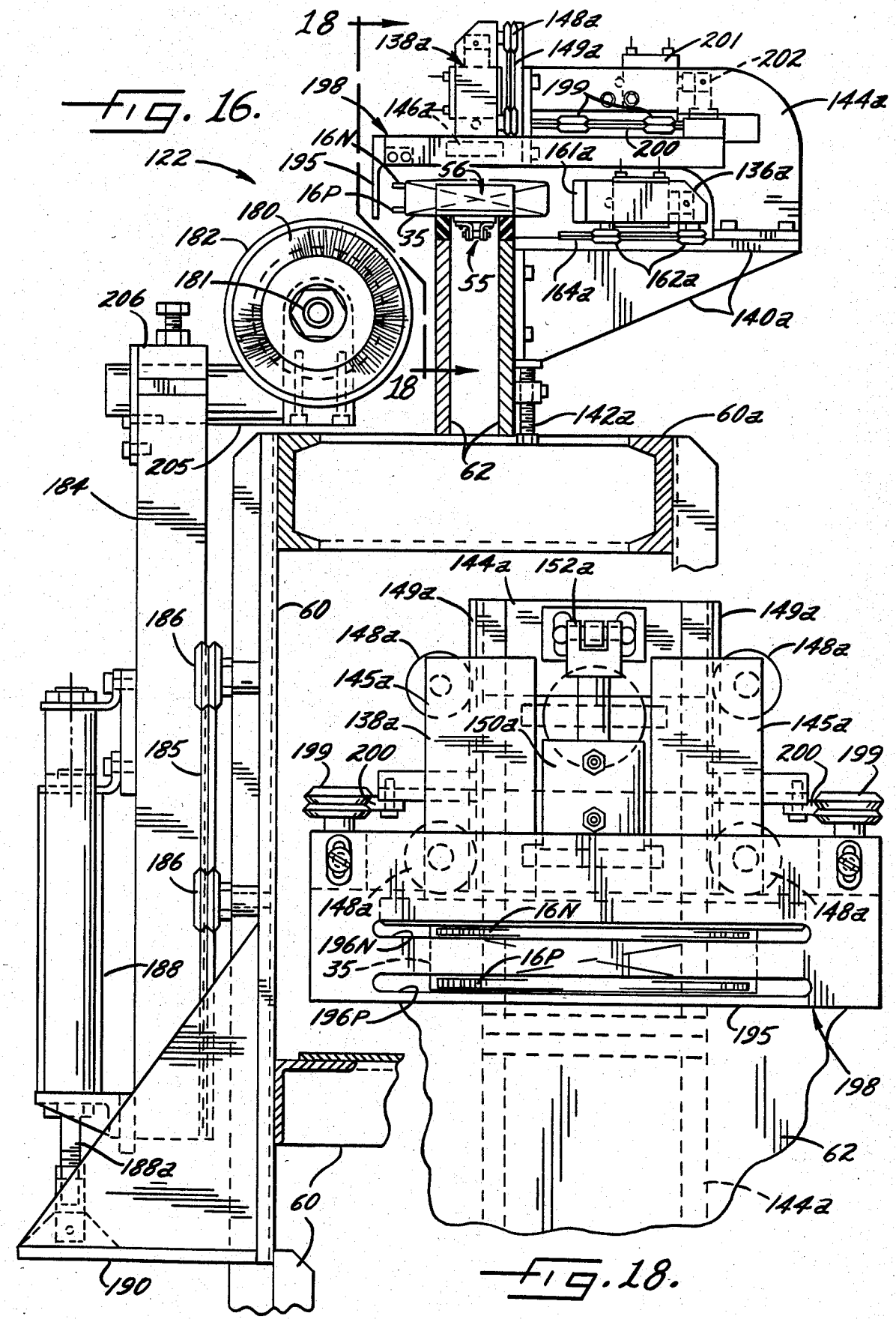

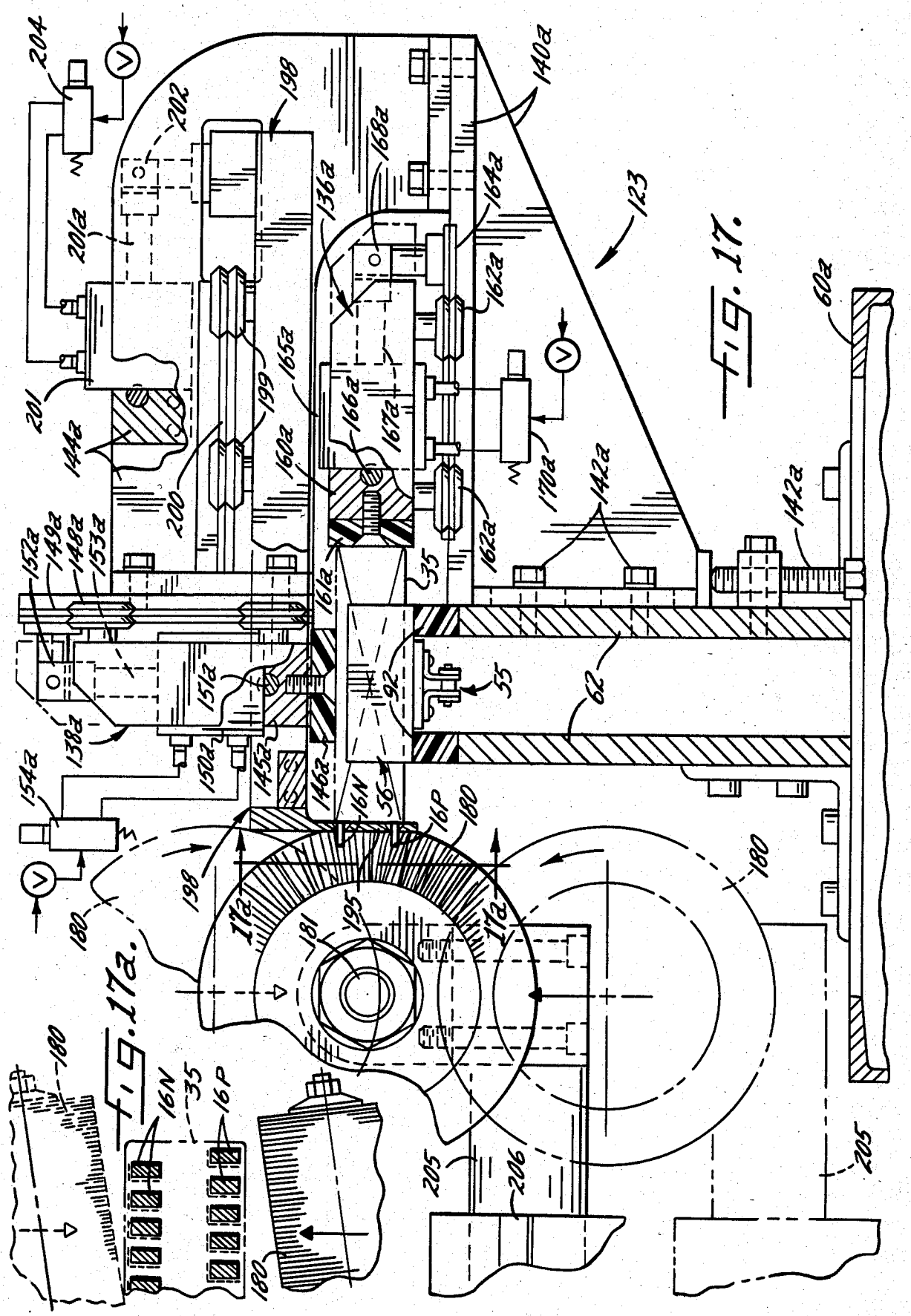

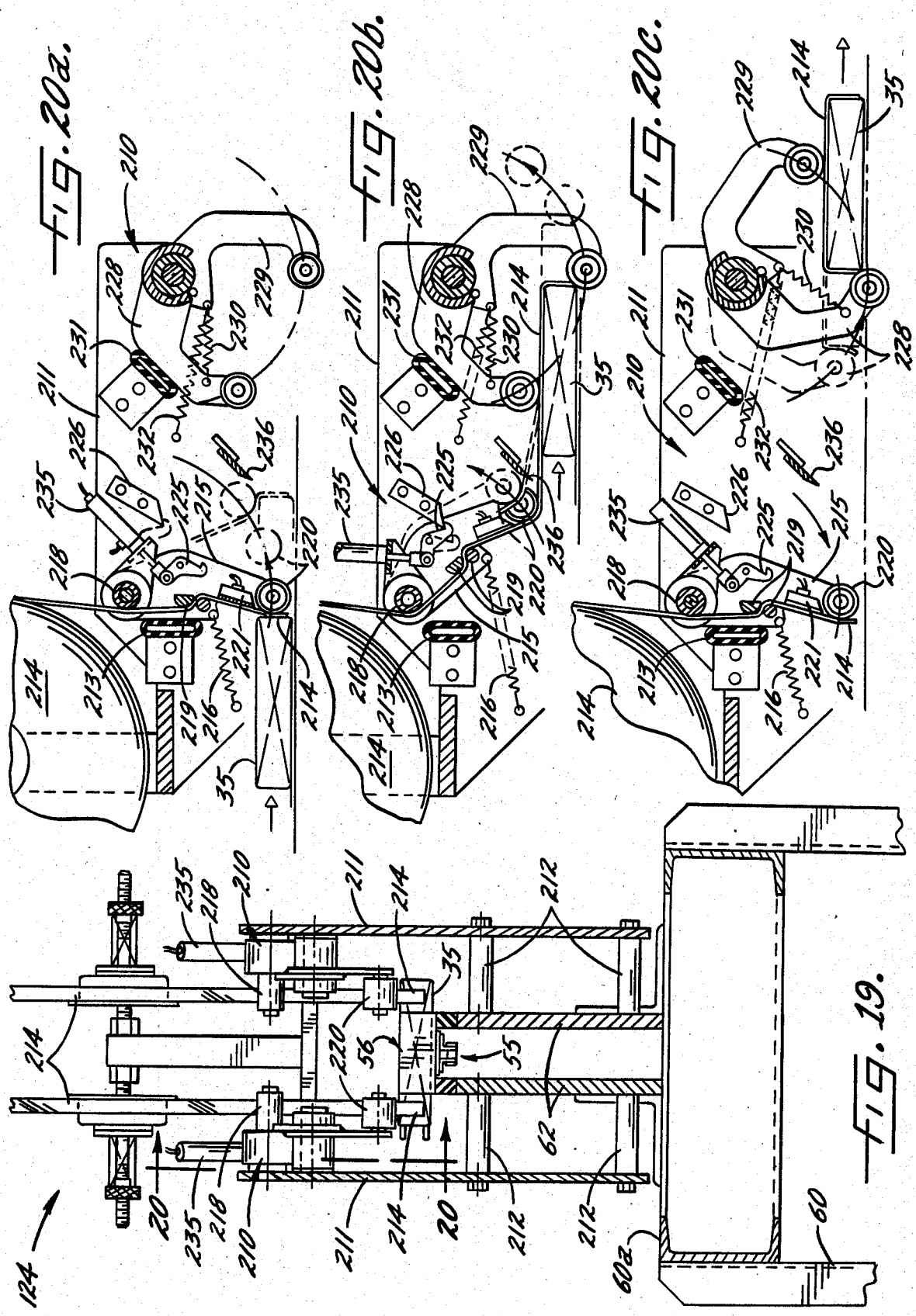

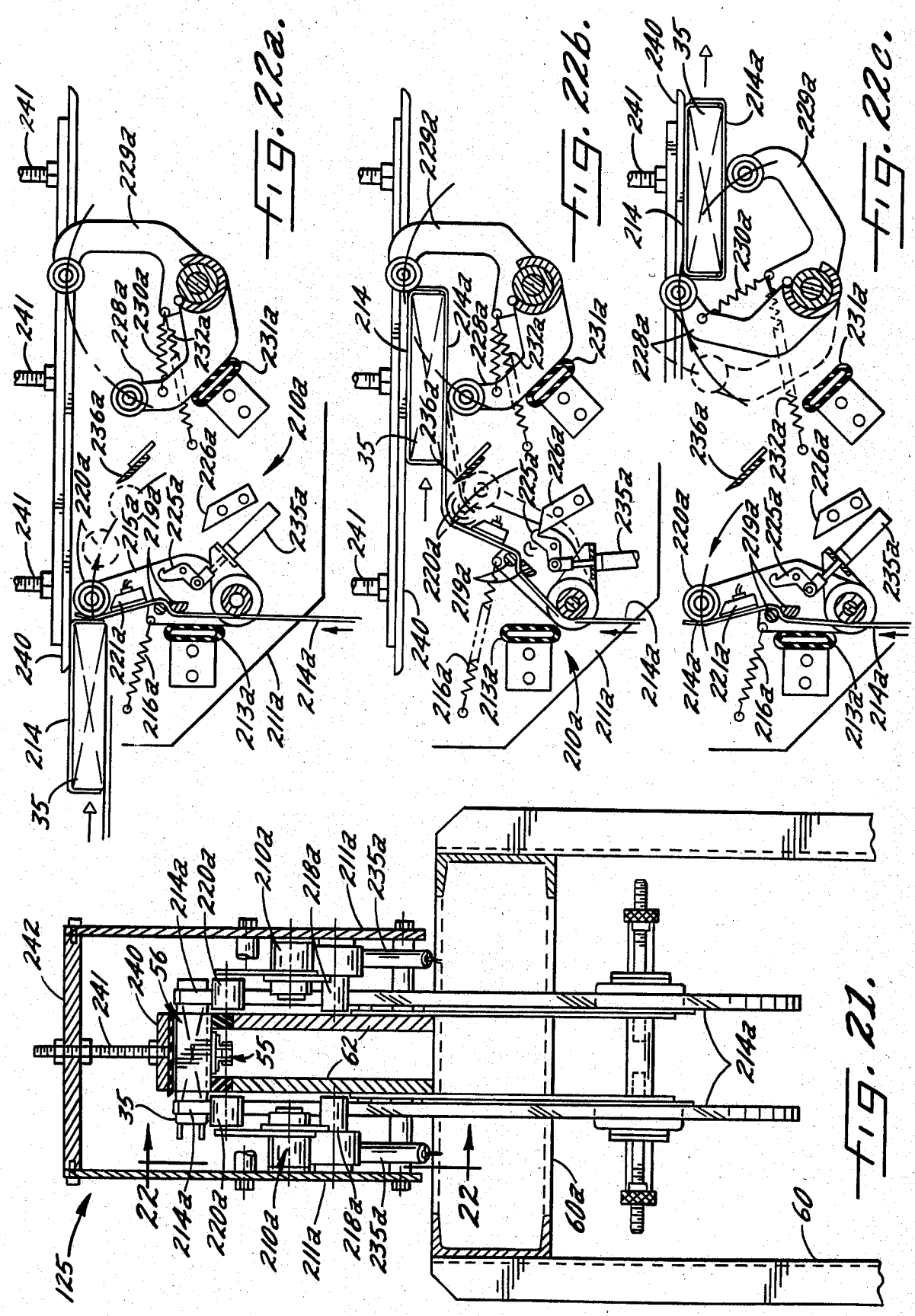

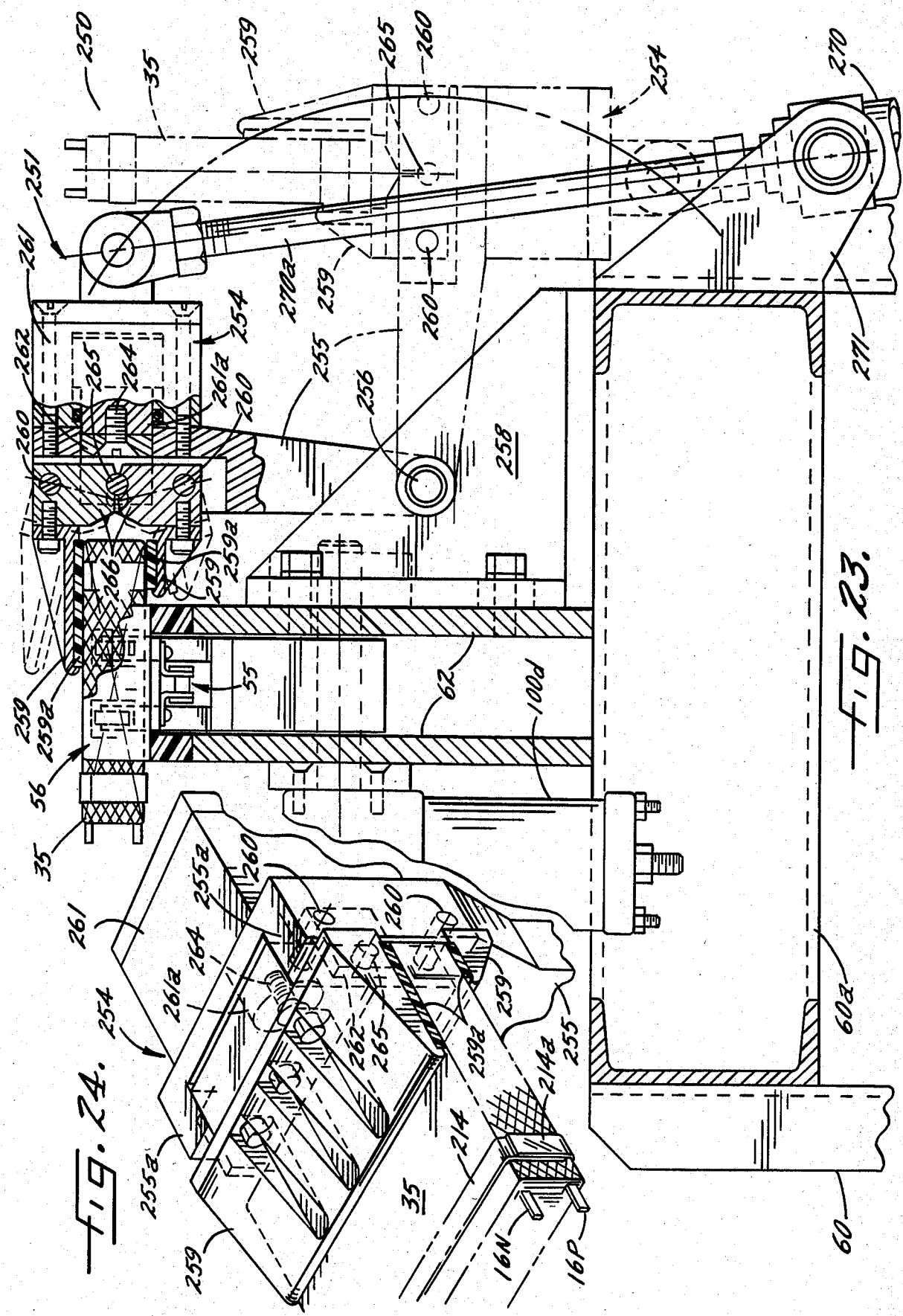

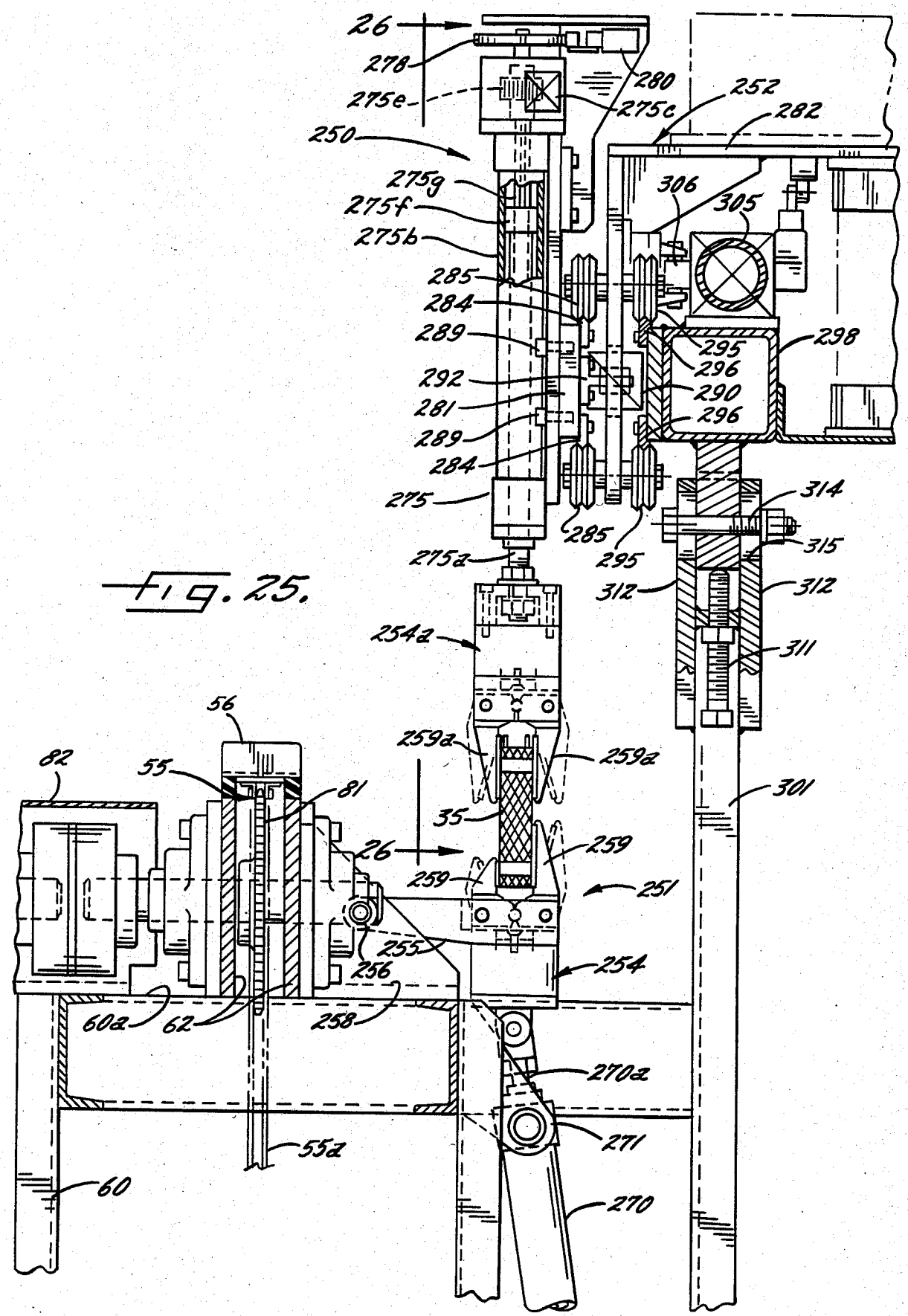

APPARATUS AND METHOD FOR PROCESSING AND TRANSFERRING BATTERY CELL ELEMENTS

RELATED APPLICATIONS

Sabatino et al., U.S. Ser. No. 381,227, filed May 24, 1982, for: Apparatus and Method for Assembling Battery Cell Elements now U.S. Pat. No. 4,510,682.

Klang and Rao, U.S. Ser. No. 352,924, now abandoned filed Feb. 26, 1982, for: Lead-Acid Battery and Method of Making Same; a continuation-in-part of U.S. Ser. No. 245,772, now abandoned filed Mar. 20, 1981.

DESCRIPTION OF THE INVENTION

The present invention relates to the assembly and processing of cell elements in the manufacture of lead-acid storage batteries.

Recent years have seen a number of developments in the lead-acid battery field for starting, lighting and ignition (hereinafter "SLI") applications. Klang et al. application Ser. No. 352,924, filed Feb. 26, 1982, assigned to Gould Inc., the parent corporation of the assignee of the present application, discloses a substantially maintenance-free SLI battery having improved power characteristics per unit weight or volume. The preferred embodiment of the battery disclosed in the Klang et al. application has cell elements which each comprise a relatively large number of small plates, ranging in number up to about 72 plates per cell or perhaps more, which are separated by a continuous accordian-folded insulator sheet. Because of the relatively large number of plates per cell and the use of an uninterrupted separator sheet, such SLI battery cell elements have not been amenable to high volume manual assembly, or to other assembly and processing techniques heretofore used in making conventional battery cell elements having relatively fewer and larger plates separated by individual insulating spacers.

The need has existed for a system for automatically and reliably handling such cell elements during their assembly and subsequent processing. Following initial assembly of such cell elements, for example, it is desirable to automatically transfer and process the elements through subsequent stations in a battery production line, without damaging the elements or adversely affecting the alignment of the electrode plates. Automated handling systems, however, can require relatively complex equipment and handling techniques such that either equipment breakdown or improperly assembled elements can result in the interruption of the entire production line.

It is an object of the present invention to provide an apparatus and method for automatically and reliably handling battery cell elements during their assembly and subsequent processing. A related object is to provide such an apparatus that is adapted for use in an automated battery production line.

Another object is to provide an apparatus and method as characterized above that is adapted to receive and complete the processing of initially assembled cell elements while effecting and maintaining precise alignment of the electrode plates.

A further object is to provide an apparatus and method of the above kind in which relatively loosely assembled cell elements are assembled and bound, the electrode plate lugs thereof thoroughly cleaned and properly aligned, and the finally processed elements positioned on a plurality of run-out conveyors in predetermined relation for reliable supply to subsequent stations in a battery production line.

Yet another object is to provide an apparatus and method of the foregoing type that permits convenient inspection, detection, and removal of defectively assembled elements without interruption of a battery production line.

Still a further object is to provide a system of element assembly and process lines of the foregoing type which are controlled such that a continuous, uniform supply of assembled cell elements is provided to a plurality of run-out conveyors, notwithstanding breakdown of one or more of the assembly and process lines.

Other objects and advantages of the invention will become apparent upon reading the following detailed description and upon reference to the drawings, in which:

FIG. 1 is a diagrammatic lay-out of a battery cell element assembly and processing system embodying the present invention;

FIGS. 2a and 2b are a more detailed diagrammatic lay-out of one of the battery cell element assembly and process lines shown in the system illustrated in FIG. 1;

FIG. 3 is an enlarged perspective of a cell element following assembly and processing through the line shown in FIG. 2;

FIG. 4 is an enlarged side elevational view of a typical one of the electrode plates included in the battery cell element shown in FIG. 2;

FIGS. 5a–5c are side elevation views of successive sections of the element transfer and processing apparatus illustrated in FIG. 2b;

FIG. 7 is an enlarged vertical section of the loading station taken in the plane of line 7—7 in FIG. 5a;

FIG. 7a is a vertical section of an element carrier at the loading station;

FIG. 8 is an enlarged vertical section of the inspection and manual unload station of the illustrated element transfer and processing apparatus taken in the plane of line 8—8 in FIG. 5a;

FIG. 15 is an enlarged vertical section of the alignment station taken in the plane of line 15—15 in FIG. 13;

FIG. 16 is a vertical section of the brushing station of the element transfer and processing apparatus taken in the plane of line 16—16 in FIG. 5b;

FIG. 17 is an enlarged elevational view of the brushing station with parts broken away and shown in section;

FIG. 17a is a schematic illustration of the lug brushing technique carried out at the brushing station, as viewed in the plane of line 17a—17a in FIG. 17;

FIG. 18 is an enlarged plan view taken in the plane of line 18—18 in FIG. 16;

FIG. 19 is a vertical section of the top tape applicator station taken in the plane of line 19—19 in FIG. 5b;

FIGS. 20a-20c are vertical sections taken in the plane of line 20—20 in FIG. 19 showing the sequential operation of one of the top tape applicators;

FIG. 21 is a vertical section of the bottom tape applicator station taken in the plane of line 21—21 in FIG. 5c;

FIGS. 22a-22c are vertical sections taken in the plane of line 22—22 in FIG. 21 showing the sequential operation of one of the bottom tape applicators;

FIG. 23 is an enlarged section of the element transfer and discharge station taken in the plane of line 23—23 in FIG. 5c;

FIG. 24 is a perspective of the clamping head of the element transfer mechanism shown in FIG. 23;

FIG. 25 is an enlarged vertical section of the element transfer and discharge station taken in the plane of line 25—25 in FIG. 5c;

Figure 6:
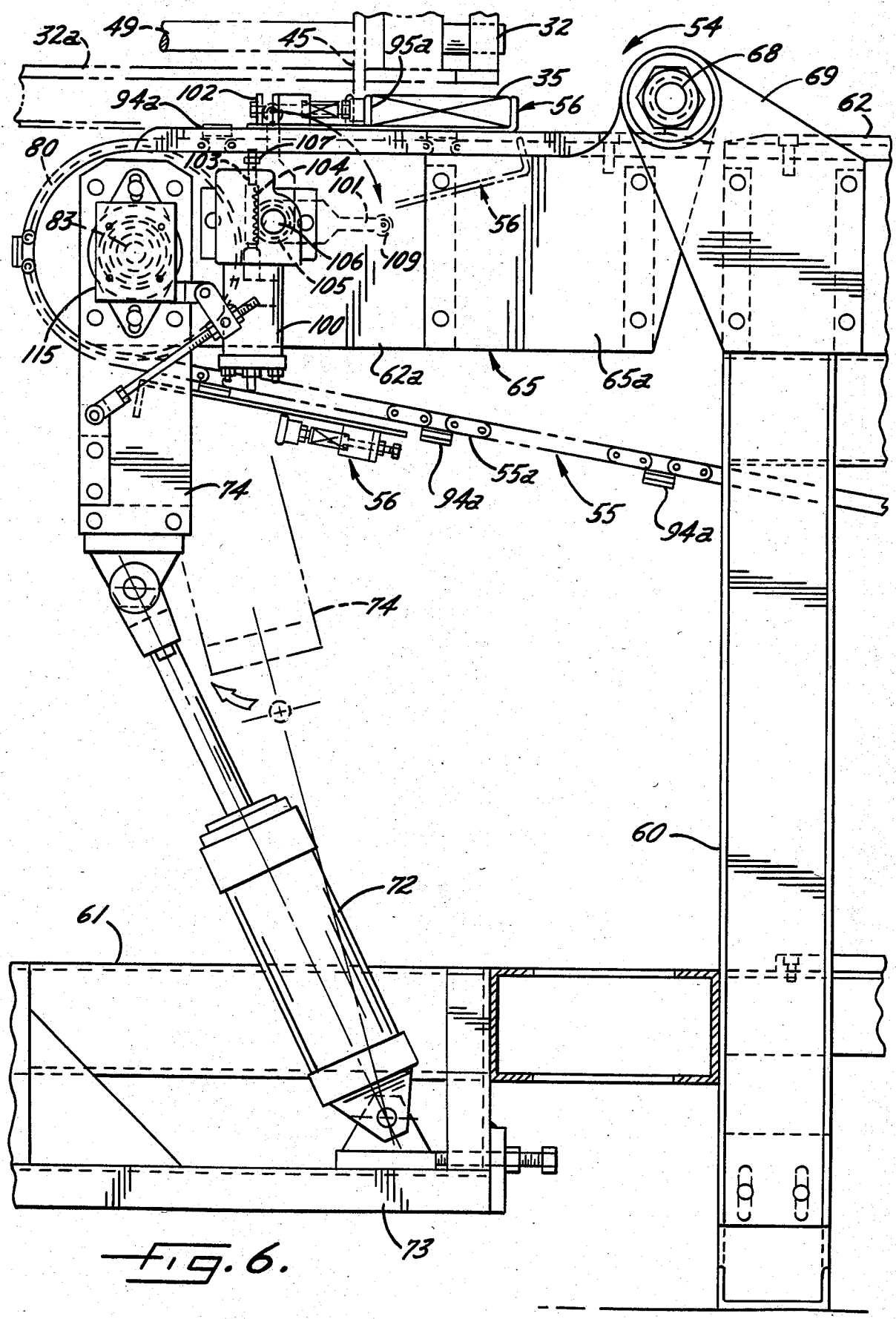
FIG. 6 is an enlarged side elevation view of the loading station for the illustrated element transfer and processing apparatus.

While the invention is susceptible of various modifications and alternative constructions, a certain illustrated embodiment has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention. Thus, while the present invention will be described in conjunction with the assembly and processing of cell elements for an SLI automotive battery, it should be appreciated that the invention is equally applicable to the assembly and processing of cell elements for other lead-acid as well as alkaline and other battery applications.

Referring now to FIG. 1, there is shown a diagrammatic lay-out of an illustrative element assembly and processing system embodying the present invention. The illustrated system includes first and second element assemblers 10 adapted to simultaneously assemble and process battery cell elements having relatively large numbers of electrode plates of alternating polarity separated by a single interleaved separator sheet and to transfer completed cell elements onto a multiple lane exit conveyor 11. The electrode plates utilized in the assembly of such elements may be of the type shown in FIG. 4, designated by the numeral 12 or sometimes more specifically as 12P, 12N to indicate polarity. Such electrode plates 12 have an elongated rectangular configuration comprising a grid 14 which carries appropriate positive or negative active material 15, or its precursor, and an integrally formed lug 16 (sometimes designated as 16P, 16N) located at an upper corner thereof. The separator sheet used may be of a known type of material, preferably being plastic made with a ribbed texture so as to effectively separate and insulate adjacent electrode plates of an assembled cell element.

The element assemblers 10 each include an element assembly apparatus 19 and element transfer and processing apparatus 20, as diagrammatically illustrated in more detail in FIGS. 2a and 2b. Each element assembly apparatus 19 basically includes a separator sheet supply station 21, a separator sheet creaser and cutting station 22, a plate load and element pre-fold station 23, and an element intermediate fold station 24. Such element assembly stations 21, 22, 23, and 24 may be of the type described in the related Sabatino et al. U.S. application Ser. No. 381,227 and the disclosure of that application is incorporated herein by reference.

In operation of such element assembly apparatus 19, a continuous length of an insulating separator sheet is drawn from a supply station reel 26 by a sheet puller 28 and positioned into a creaser 29 at the succeeding station 22. Upon positioning of the separator sheet into the creaser 29, the sheet is creased at longitudinally spaced fold points and cut to a predetermined length. A first plate loader 30P at the succeeding plate load and pre-fold station 23 simultaneously positions a first set of electrode plates 12P of common polarity onto a pre-folder 31, after which a sheet transfer mechanism 32 transfers the cut and creased separator sheet from the creaser 29 into position over the first set of plates 12P on the prefold mechanism 31 and a second plate loader 30N places a second set of electrode plates 12N of opposite polarity onto the separator sheet. The pre-fold mechanism 31 thereupon loosely folds the separator sheet to a first predetermined length with electrode plates of opposite polarity occupying alternate folds on opposite sides of the sheet. An intermediate fold mechanism 32 at the next station 24 then engages the pre-folded element assembly, positions the plates thereof into alignment, and compresses the assembly to form an intermediate or shorter length cell element. While the element assembly apparatus 19 is capable of high-volume, automated production of battery cell elements, the operating efficiency of such apparatus when incorporated in a continuous battery production line can be dependent upon the reliable handling and further processing of the assembled cell elements.

Figure 7:
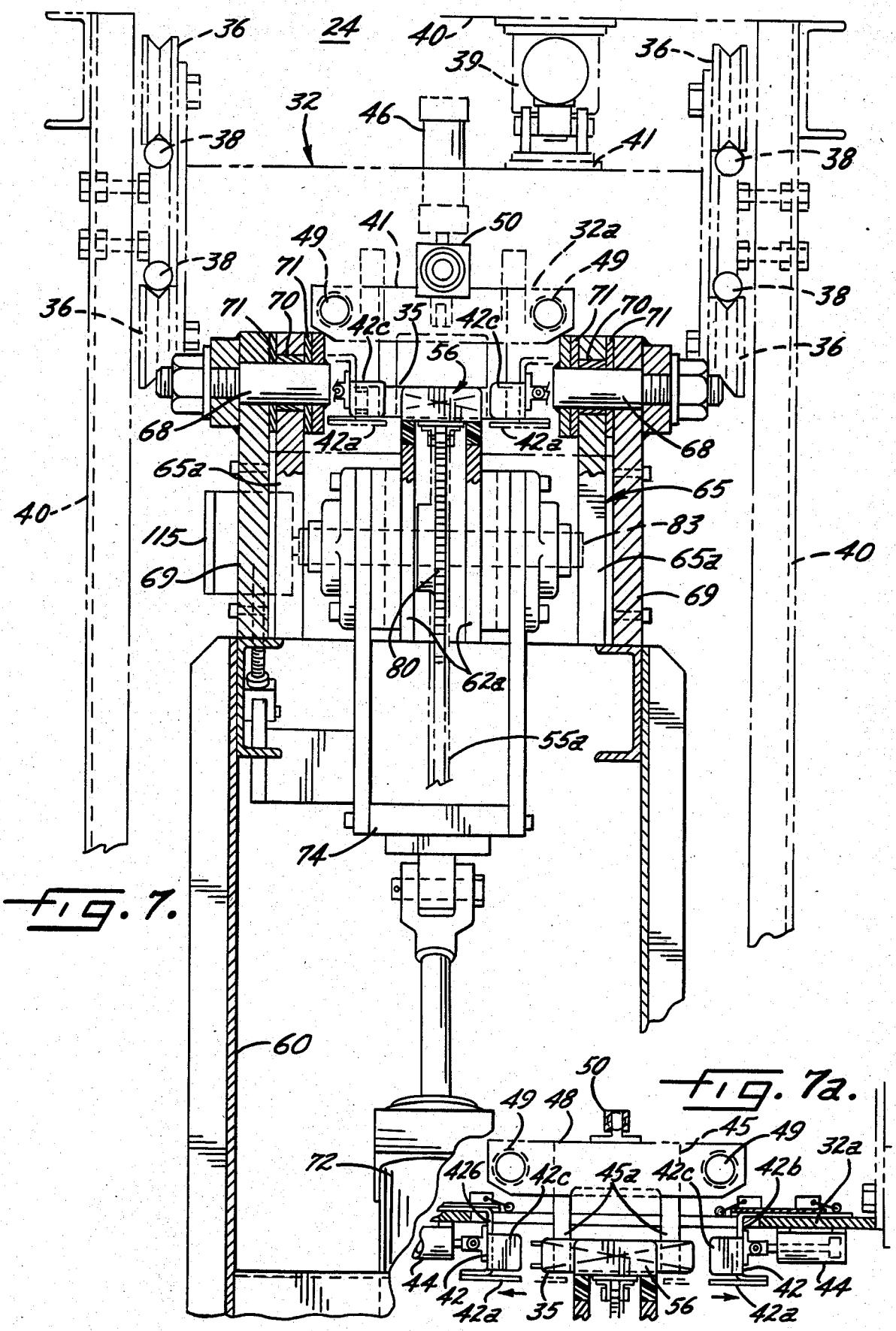

In accordance with the invention, the element transfer and processing apparatus is adapted to successively receive assembled cell elements from the assembly apparatus, transport the elements through further processing stations, and deposit completed cell elements onto an exit conveyor in predetermined orientation and with the plate lugs thereof properly aligned such that the elements may be efficiently utilized at succeeding operating stations of an automated battery production line. To this end, the element transfer and processing apparatus 20, as shown in more detail in FIGS. 5a-5c, is coupled to the downstream end of the element assembly apparatus 19 for successively receiving assembled cell elements 35 from the intermediate fold mechanism 32. As shown in FIGS. 5a and 7, the intermediate fold mechanism 32 includes a carriage 32a having rollers 36 supported on rails 38 for movement between the pre-fold station 23 and the intermediate fold station 24 by the actuation of a rodless cylinder 39 which is mounted on a frame 40 of the element assembly apparatus 19 and operatively coupled to an upstanding forward plate 41 of the intermediate fold carriage 32a.

For supporting and aligning opposed sides of a pre-folded element, the intermediate fold carriage 32a in this instance has a pair of transversely spaced channels 42 which each define a base plate 42a and a side plate 42b and are transversely movable relative to each other by the actuation of respective air cylinders 44 (FIGS. 7 and 7a). For retaining opposed ends of a pre-folded element, the forward ends of the channels 42 each are formed with an inwardly turned flange 42c, and a downwardly directed U-shaped gate 45 is mounted at the rear of the carriage 32a for selected vertical movement by the actuation of an air cylinder 46 (FIG. 5a). The gate 45 is carried on a mounting block 48 that in turn is mounted on guide rods 49 for forward and rearward movement by the actuation of a cylinder 50 supported by the carriage 32a. It will be appreciated that alternatively the intermediate fold carriage 32a could have gates at both the rear and forward ends and pivotable side engaging alignment plates, as disclosed in the aforementioned Sabatino et al. application Ser. No. 381,227.

In operation of the illustrated intermediate fold mechanism 32, with the carriage 32a located at the pre-fold station 23, the rear gate 45 raised, and the side channels 42 in their open positions, actuation of the cylinders 46,44 will lower the gate 45 and move the channels 42 inwardly positioning the base plates 42a under a pre-folded element at the pre-fold station and the side plates 42b into aligning engagement with opposed ends of the element electrode plates 12. A paddle assembly 31a of the pre-folder 31 may be lowered by the actuation of a cylinder 33, as described in the aforesaid Sabatino et al. application Ser. No. 381,227, leaving the pre-folded element supported on the intermediate fold carriage base plates 42a in relatively loosely folded condition. Actuation of the cylinder 50 will then move the gate 45 forwardly, as shown in FIG. 5a, compressing the pre-folded assembly to form an element 35 of shorter intermediate folded length, and simultaneous actuation of the cylinder 39 will move the intermediate fold carriage 32a to the intermediate fold station 24 for pick-up by the transfer and processing apparatus 20 at a loading station 54 of that apparatus.

In carrying out the invention, the element transfer and processing apparatus 20 includes an endless chain conveyor 55 having a plurality of element carriers 56 for successively receiving intermediate folded elements 35 at the intermediate fold station, compressing the elements to final size, and transferring the elements through a plurality of processing stations. The illustrated element transfer and processing apparatus 20 has a floor mounted frame 60 joined to the downstream end of the assembly apparatus frame 40 by a connecting member 61. The frame 60 has an elevated base 60a that supports a pair of upstanding conveyor tracks 62 (best shown in FIG. 8) that are in close transversely spaced relation and extend the longitudinal length of the frame 60.

Mounted for pivotable movement at the upstream end of the conveyor tracks 62 is a loading arm 65 having a pair of tracks 62a of similar height and spacing to the tracks 62 (FIGS. 5a, 6, and 7). The loading arm 65 has a pair of parallel mounting plates 65a that are fixed in outstanding relation to the tracks 62a and are pivotably supported on stub shafts 68 carried by mounting plates 69 fixed in rearwardly extending relation to the frame 60. Bushings 70 and spacers 71 are provided on the stub shafts 68 to facilitate arm movement (FIG. 7). In order to selectively pivot the loading arm 65 between a lowered position (shown in FIG. 5a) which permits movement of the intermediate fold carriage 32a to a position over the loading arm 65 and a raised horizontal position (FIG. 6) for locating a carrier 56 in element receiving position and permitting movement of a carrier from the loading arm 65 onto the then aligned conveyor tracks 62, an air cylinder 72 is pivotably mounted between a bracket 73 on the frame member 61 and a depending leg 74 of the loading arm 65.

Figure 27:
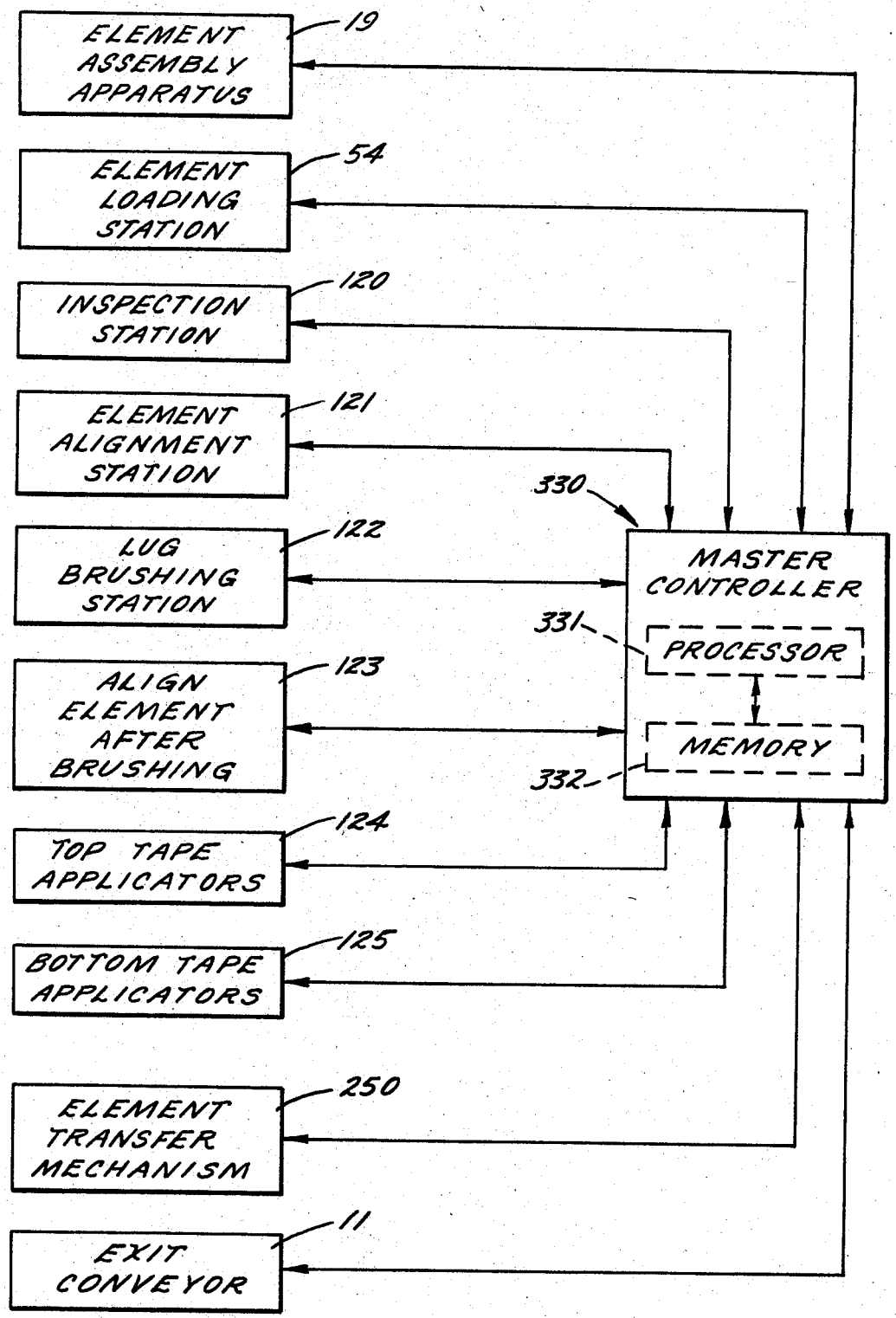
FIG. 27 is a schematic of the Master Controller for the illustrated apparatus.

The conveyor 55 includes a chain 55a trained about an upstream sprocket 80 (FIGS. 6 and 7) mounted on shaft 83 rotatably carried by the loading arm 65 and a drive sprocket 81 at the downstream end of the tracks 62 (FIGS. 5c and 25). The drive sprocket 81 is driven through a right angle coupling 82 by an electric motor 86 which is intermittently operated under the control of a Master Controller 330 (FIG. 27), as will become apparent, for intermittently indexing the chain 55a and the element carriers 56 supported thereon to successive stations along the tracks 62.

Figure 8:
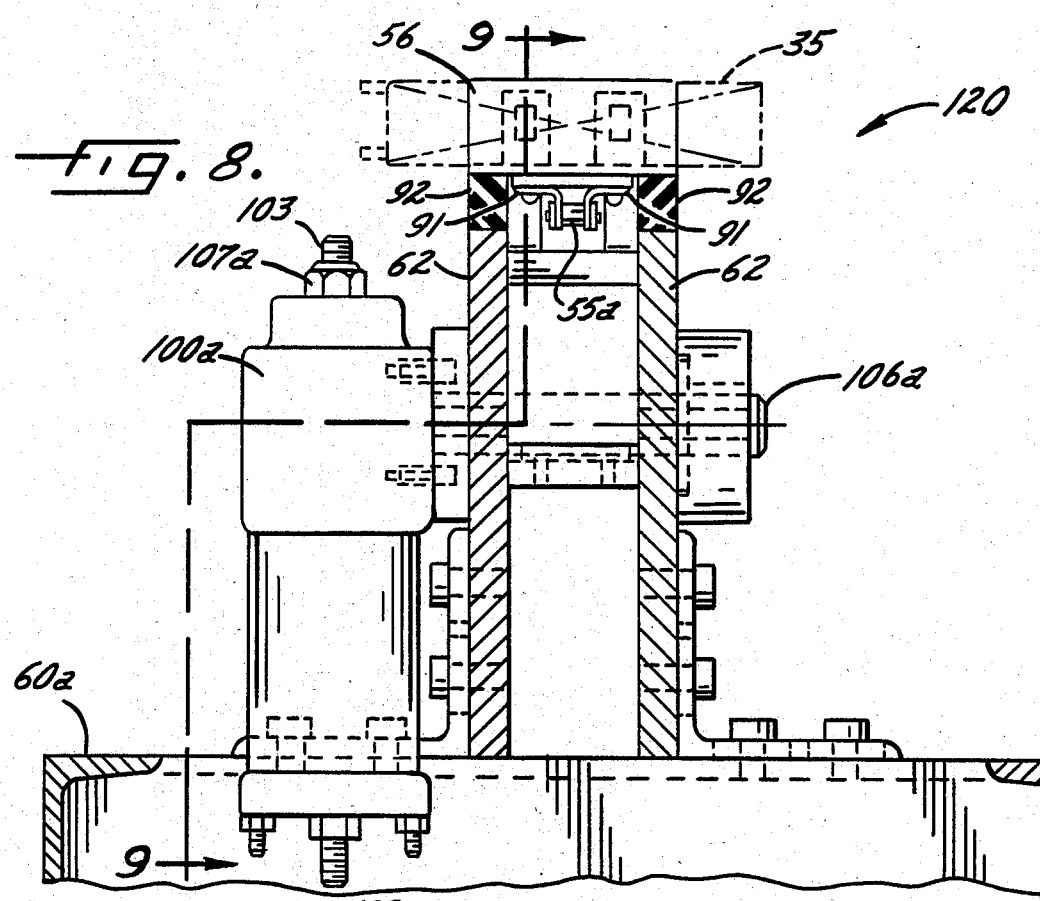
Figure 9:
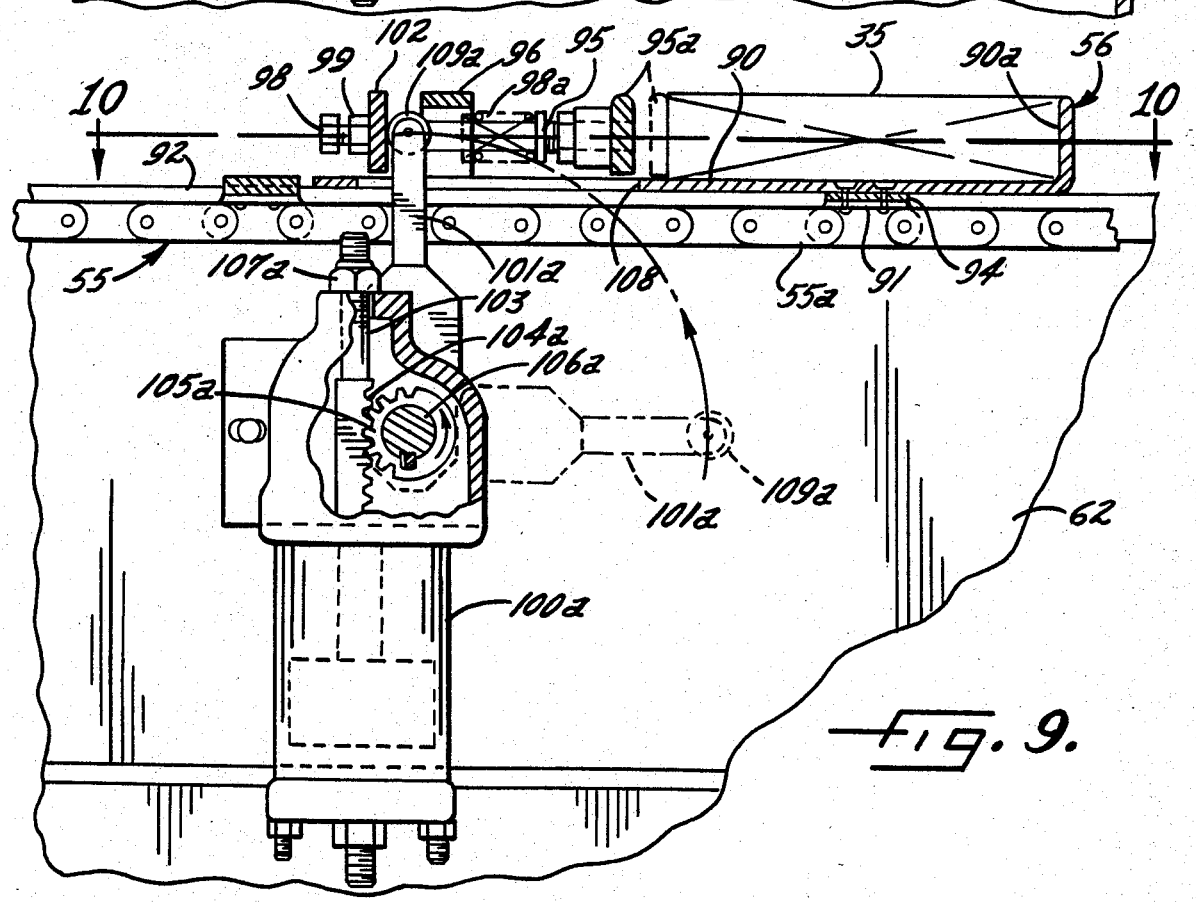
FIG. 9 is a vertical section taken in the plane of line 9—9 in FIG. 8 showing an element carrier with the element engaging plunger thereof being opened to permit manual removal of an element at the inspection station.
Figure 10:
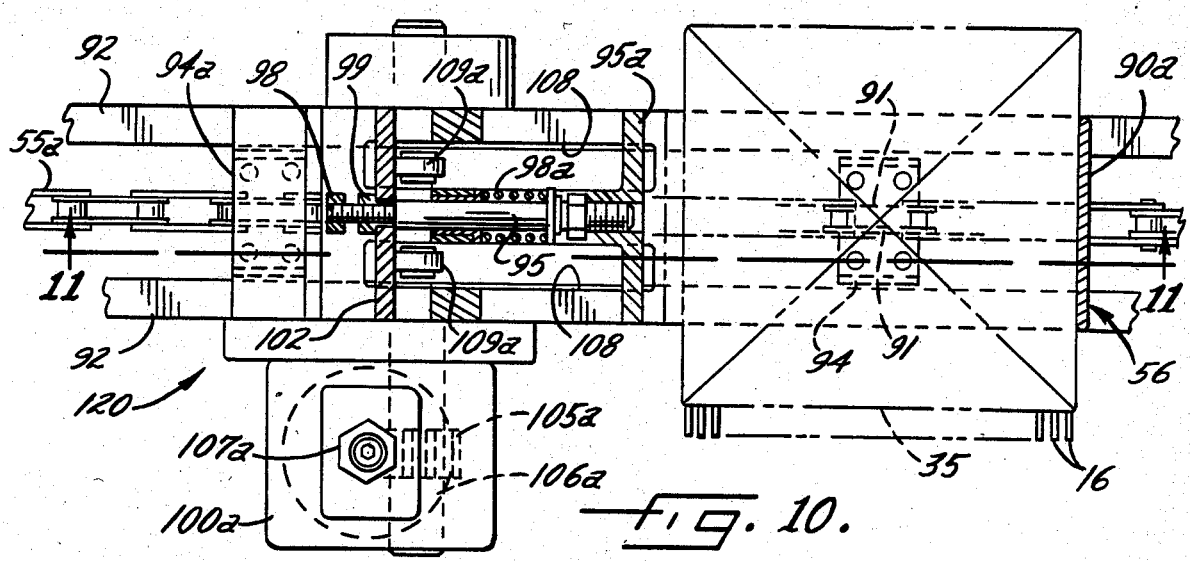
FIG. 10 is a horizontal section of the element carrier at the inspection station taken in the plane of line 10—10 in FIG. 9 showing the plunger thereof in element engaging position.
Figure 11:
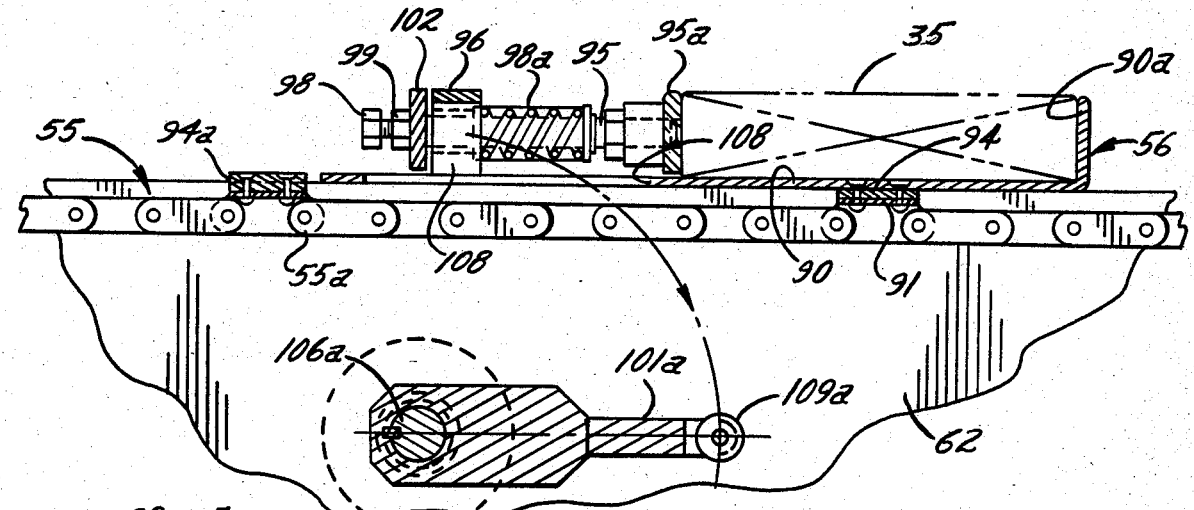
FIG. 11 is a vertical section of the element carrier taken in the plane of line 11—11 in FIG. 10.
Figure 12:
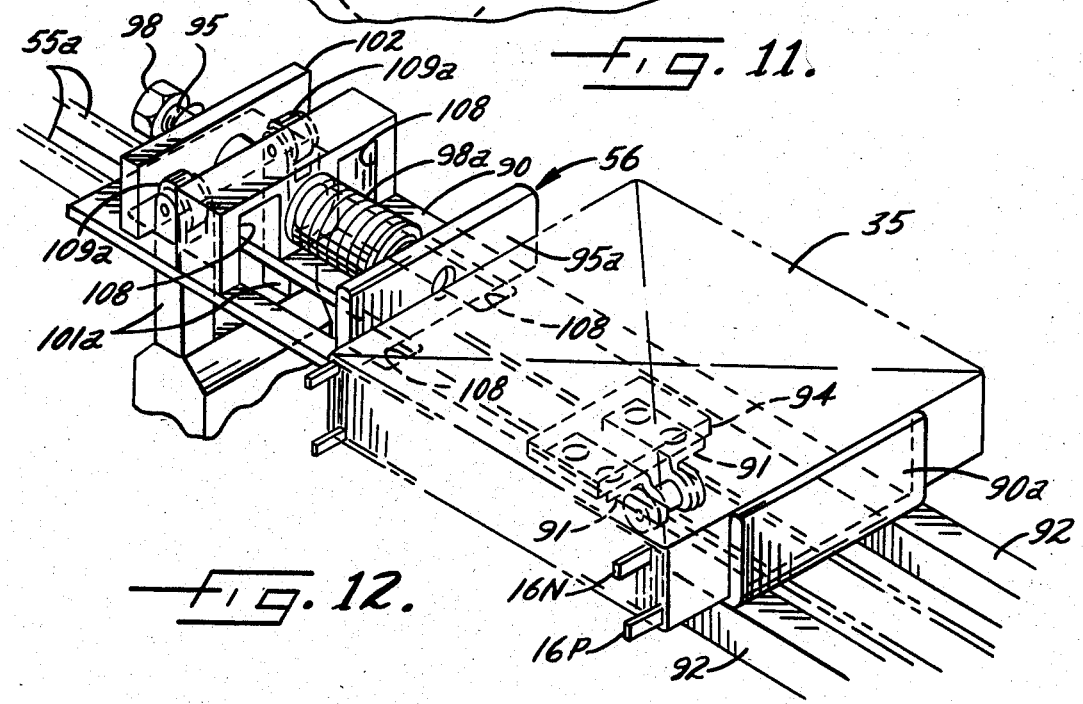
FIG. 12 is a perspective of the element carrier shown in FIGS. 9–11 showing the element engaging plunger thereof in the open position.

The element carriers 56, as best shown in FIGS. 9–12, each include a base plate 90 which has a width substantially equal to the outer dimension of the tracks 62 for riding on top of the tracks. Each carrier base plate 90 is secured to a link of the chain 55a by a pair of brackets 91 which in turn are riveted to the bottom of the base plate 90. Movement of the chain 55a will thereby move the carrier base plates 90 along the tracks 62, and to facilitate such movement, plastic wear strips 92 are mounted on top of the tracks 62 (FIG. 8). For retaining the carriers 56 on the tracks 62, a guide plate 94 is interposed between the underside of each carrier base plate 90 and chain bracket 91 so as to ride between the wear strips 92. Similar guide plates 94a are mounted at spaced intervals on links of the chain 55a between carriers 56.

In order to releasably engage an intermediate folded element at the intermediate fold station 24, each carrier base plate 90 has an upturned forward end 90a and a spring biased element engaging plunger 95 between which an element 35 may be retained. The plunger 95 in this case is in form of a rod with an element engaging head 95a threadedly secured on the forward end thereof. The plunger 95 is supported for translational movement in a block 96 fixed in upstanding relation on the carrier base plate 90, and a spring 98a is interposed between the head 95a and block 96 for urging the plunger 95 in an element engaging and compressing direction. To permit selective adjustment of the stroke of the plunger 95, the plunger may be rotated by turning a nut 98 welded on the rear end thereof so as to adjustably locate the head 95a on the forward threaded end. A lock nut 99 is provided for captively securing the head 95a at a desired location on the plunger 95. It will be appreciated that by adjustment of the stroke of the plunger 95 and selection of a proper biasing spring 98a, an element 35 received and engaged by the carrier 56 can be compressed to a final desired size for further processing.

In further carrying out the invention, means are provided for cyclically actuating the plunger of each carrier to an open position following indexing of the carrier onto the loading arm so that the carrier may then be moved into element receiving position upon raising of the loading arm. To this end, a rotary actuator 100 is mounted on the loading arm 65 and has a pair of pivotable cam arms 101 that are movable on opposite sides of the chain 55a for engaging a cam plate 102 fixed to the rear end of the plunger 95 (FIG. 6). The rotary actuator 100 in this instance is an air cylinder having a piston mounted rack 104 which, upon appropriate actuation of the cylinder, rotates a pinion 105 and a shaft 106 upon which the cam arms 101 are mounted. Upon actuation of the rotary actuator 100 to move the rack 104 to an upward position, as shown in FIG. 6, the cam arms 101 are moved to a lowered horizontal position. Reverse actuation of the actuator 100 will lower the rack 104, causing the cam arms 101 to be pivoted upwardly into engagement with the carrier cam plate 102, moving the cam plate 102 and plunger 95 rearwardly against the biasing force of the spring 98a. For selectively limiting downward movement of the rack 104, and thus upward movement of the cam arms 101, a stop nut 107 in this instance is adjustably mounted on an outwardly extended threaded end 103 of the rack 104. To permit upward movement of the cam arms 101, the carrier base plate 90 and block 96 are formed with a pair of transversely spaced slots 108 (best shown in FIG. 12) disposed on opposite sides of the chain 55a located below. The cam arms 101 in this instance each carry a roller 109 to enable smooth engagement with the cam plate 102.

For monitoring the rotative position of the chain sprocket 80, and thus the position of the element carriers 56 on the loading arm 65 and tracks 62, an encoder 115 of a known type is mounted on the loading arm 65 in operative engagement with the sprocket shaft 83. It will be understood that the operation of the chain drive motor 86, the loading arm pivot cylinder 72, and the rotary actuator 100 may be operated in timed sequence with the operation of the intermediate fold carriage 32a, all under the control of the Master Controller 330, as will become apparent.

Hence, the intermediate fold carriage 32a may be moved to the loading station 54 of the transfer and processing apparatus 20 by actuation of the rodless cylinder 39 when the loading arm 65 is in a lowered position with an empty element carrier 56 located thereon (FIG. 5a). The rotary actuator 100 then may be actuated to open the carrier plunger 95, and the cylinder 72 actuated to move the loading arm 65 into horizontal position with the carrier 65 receiving an intermediate folded element 35 in the intermediate fold carriage 32a. Upon reverse actuation of the rotary actuator 100, the cam arms 101 are lowered, as shown in phantom in FIG. 6, permitting the carrier plunger 95 to engage the intermediate folded element through an opening 45a (FIG. 7a) in the U-shaped intermediate carriage gate 45 and compress the element under the biasing force of the spring 98a. Upon retraction of the intermediate fold carriage channels 42 (FIG. 7a), and return movement of the intermediate fold carriage 32a to the pre-fold station 23, the conveyor motor 86 may be energized to index the carrier 56 and the element 35 engaged therein to the next station, while simultaneously indexing the next empty carrier onto the loading arm 65, which is then returned to its lowered position to permit return of the intermediate fold carriage and repeat of the operating cycle.

In further carrying out the invention, the element transfer and processing apparatus 20 includes a plurality of operating stations, in this instance including an element inspection and manual unload station 120, a plate alignment station 121, a lug brushing station 122, and alignment after brushing station 123, a top tape applicator station 124, and a bottom tape applicator station 125, which successively process cell elements 35 in a manner that facilitates their subsequent utilization in an automated battery production line.

Following loading of an element in a carrier 56 at the loading station 54, the carrier 56 is indexed to the inspection and manual unload station 120 where the element can be both automatically monitored and manually inspected. For sensing whether the element 35 improperly protrudes above the carrier 56, such as the result of improper loading or defective assembly, an electric eye 130 and reflector 131 are mounted at the inspection station 120 on opposite sides of the path of travel of the carrier 56 and at an elevation slightly above the level of a properly transported element (FIG. 2b and 5a). In the event any portion of the element 35 extends above the level of the beam of the electric eye 130, an appropriate sensor will be activated to alert the machine operator, such as by sounding of an alarm or automatically shutting down the apparatus 20.

Upon said such sensor activation, or an operator otherwise noticing a defective element 35 in the carrier 56 at the inspection station 120, means are provided for opening the element engaging plunger 95 of the carrier to permit manual removal of the element. To this end, a rotary actuator 100a, similar to the rotary actuator 100 at the loading station 54, is mounted on the side of the tracks 62 at the inspection station, as shown in FIGS. 8-12. The rotary actuator 100a similarly includes a piston mounted rack 104a for driving a pinion 105a which in turn is mounted on a shaft 106a supported between the tracks 62. Upon actuation of the rotary actuator 100a, such as by manual engagement of a palm button 132 located at the inspection and manual unload station 120 (FIGS. 5a), cam arms 101a are moved from a normal retracted position to a raised cam plate engaging and plunger opening position. In the usual case, a problem with the element 35 can be quickly corrected and the element replaced in the carrier while still at the inspection station 120 so as to permit the continued normal processing of the element. Although in the illustrated embodiment, a single inspection and manual unload station 120 is shown, it will be understood that several such stations could be provided to permit additional monitoring of the element being processed or to provide further stations to correct and replace defective elements.

Figure 13:
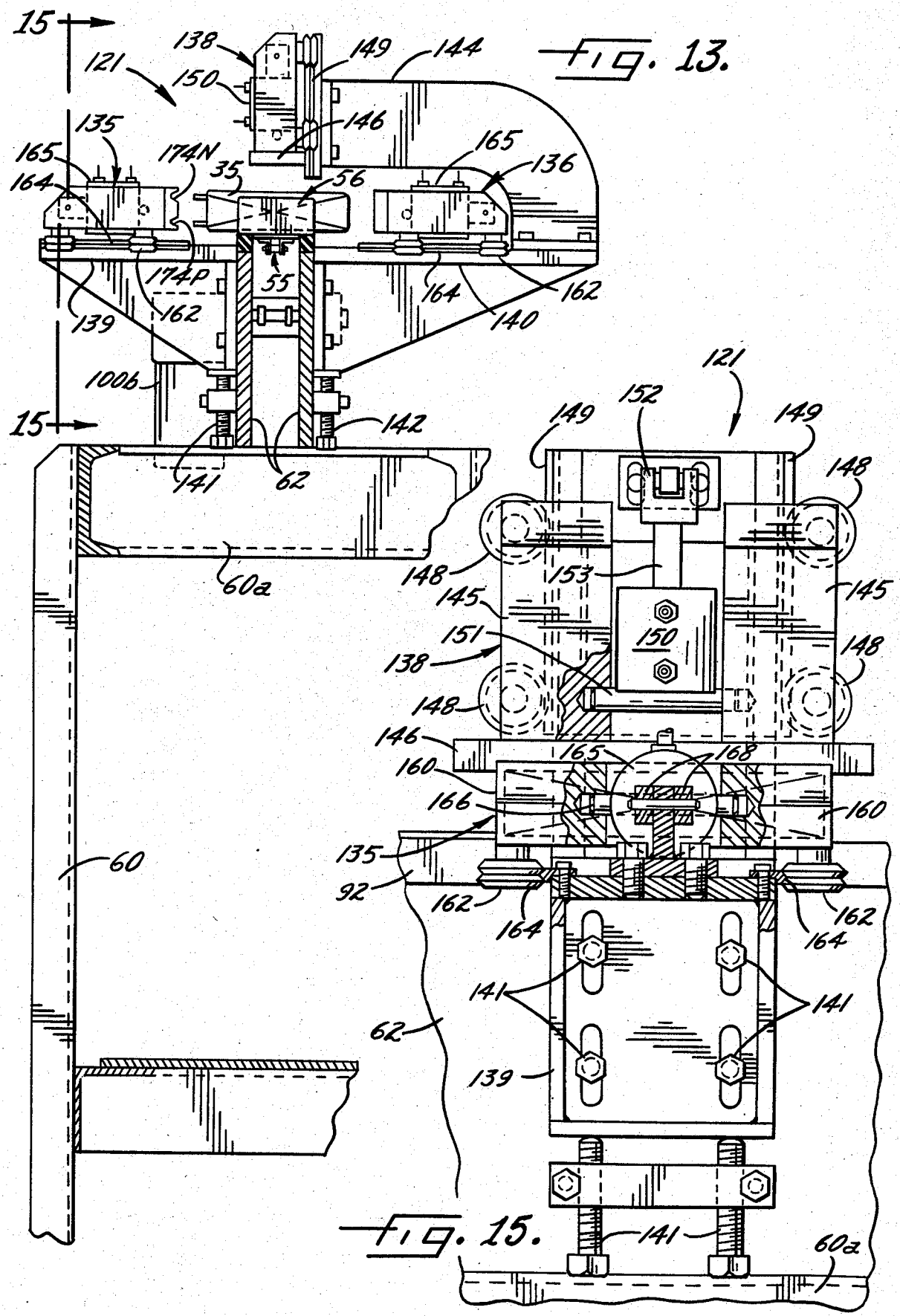
FIG. 13 is a vertical section of the alignment station of the element transfer and processing apparatus taken in the plane of line 13—13 in FIG. 5b.
Figure 14:
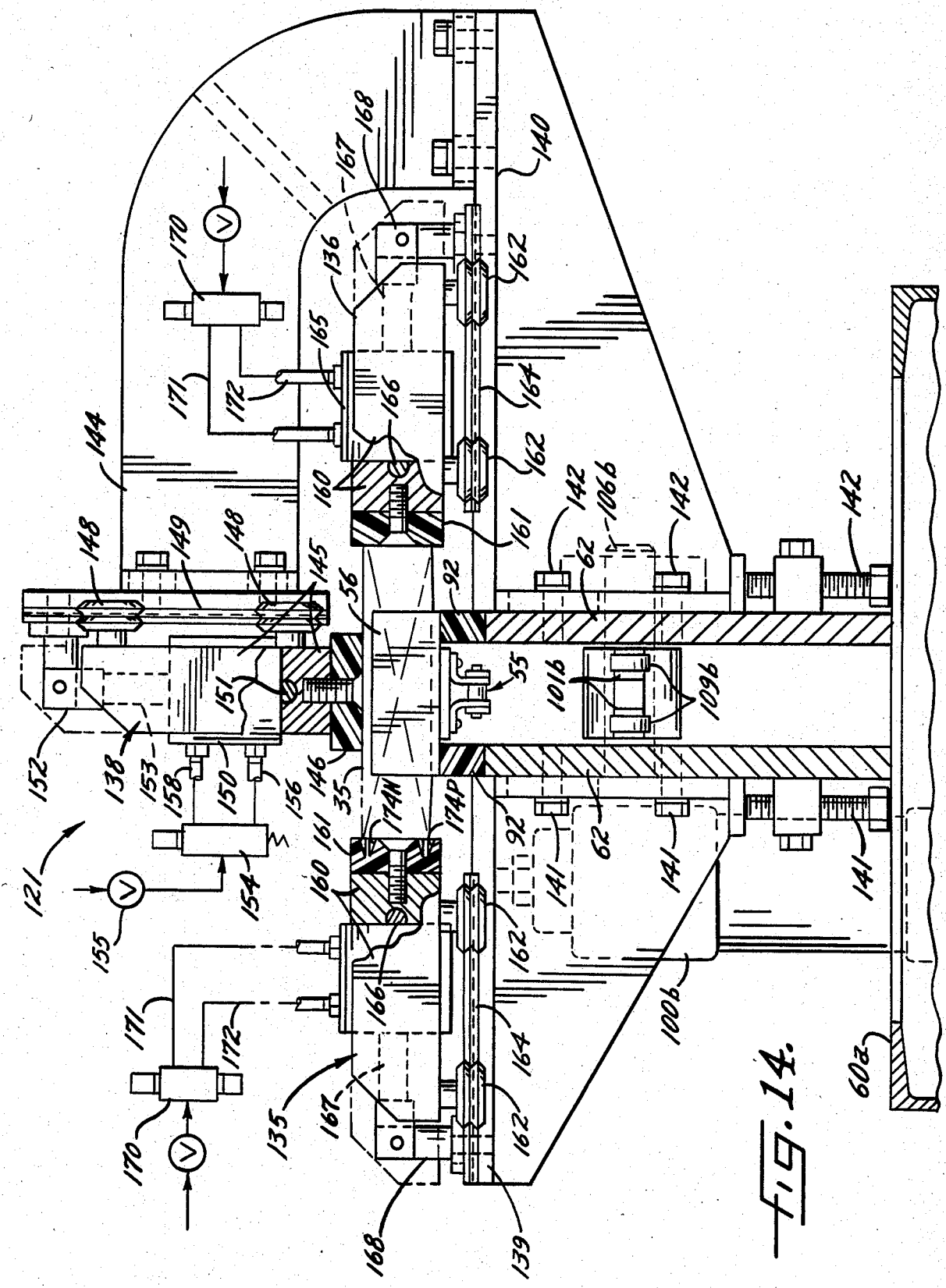
FIG. 14 is an enlarged elevational view of the alignment station with parts broken away in section.
Figure 26:
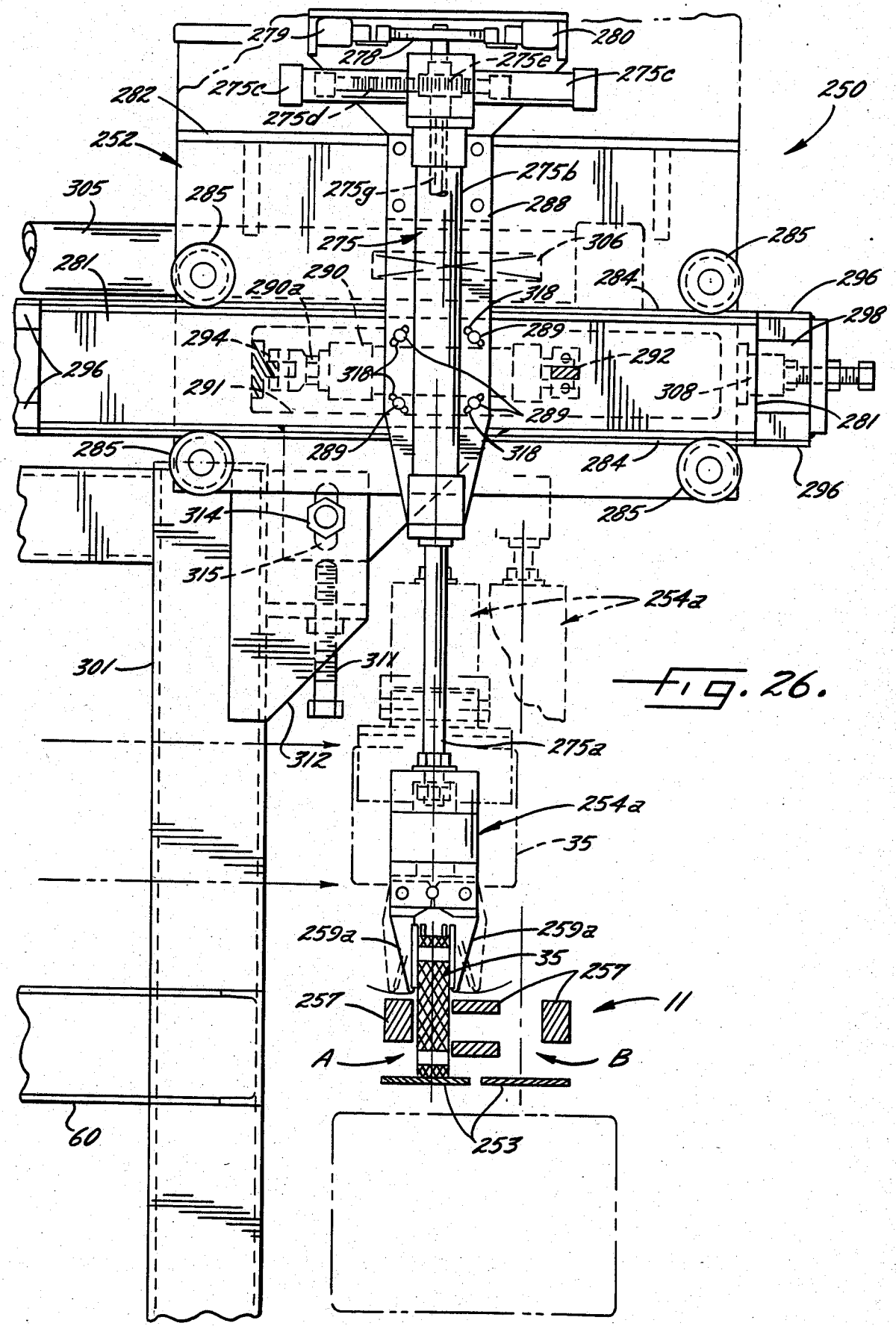
FIG. 26 is a side elevation view of the element transfer and discharge station taken in the plane of line 26—26 in FIG. 25.

Upon subsequent indexing of the conveyor 55, an element carrier 56 is advanced from the inspection and manual unload station 120 to the alignment station 121, shown in FIGS. 13-15, where the electrode plates 12 of the element are positioned in relatively precise alignment. The illustrated alignment station 121 includes electrode plate tamping heads 135, 136 mounted on opposed sides of the tracks 62 and an overhead element retaining head 138 that assists in maintaining the element in position on a carrier 56 during plate tamping. The tamping heads 135, 136 each are mounted on respective mounting plates 139, 140 extending in cantilever fashion outwardly from opposed sides of the tracks 62. The mounting plates 139, 140 are vertically adjustable by means of screws 141, 142 for locating the tamping heads 135, 136 immediately adjacent the ends of the elements 35 being transferred to the station.

The element retaining head 138 is mounted at the end of a C-shaped support 144 that in turn is secured to the outermost end of the cantilever support 140. The element retaining head 138 comprises a pair of side blocks 145 having a pad 146 transversely across the lower ends thereof and rollers 148 on opposed sides thereof for supporting the retaining head for vertical movement on tracks 149 carried by the support 144. For raising and lowering the retaining head 138, a cylinder 150 is fixed at its lowermost end to the side blocks 145 by a rod 151 and has an upwardly extending piston rod 153 secured at its outer end to an upper extension of the support 144 by a coupling 152. For controlling operation of the cylinder 150, a spring return solenoid valve 154 (FIG. 14) is provided which upon actuation permits pressurized air flow from a regulator 155 through line 156 to extend the cylinder 150 and move the retaining head 138 into engagement with an element 35 located on a carrier at the alignment station.

Upon lowering of the retaining head 138 into element engagement, means are provided for at least partially releasing the spring biased engagement of the carrier plunger 95 with the element. For this purpose, a rotary actuator 100b, similar to the rotary actuator 100a at the inspection station, is mounted at the alignment station and is automatically actuated following lowering of the retaining head 138 into element engaging position. The stop nut 107b for the rotary actuator 100b preferably is set so as to limit the downward stroke of the actuator rack, and thus the upward movement of the actuator cam arms, such that the carrier plunger 95 is moved to a position in which the element is loosely retained between the plunger head 95a and the forward carrier end so as to permit relative easy movement of the individual element plates 12 into aligned positions during operation of the tamping heads 135, 136.

The tamping heads 135, 136 have a construction generally similar to the element retaining head 138, each consisting of a pair side blocks 160 which carry a pad 161 at one end and have rollers 162 on opposed sides for supporting the head for rolling movement on horizontal tracks 164 carried by the cantilever supports 140, 139. For moving the tamping heads 135, 136 toward and away from an element located at the alignment station, each tamping head has a cylinder 165 fixed at one end to the side blocks 160 by a rod 166 with its cylinder rod 167 secured at its outer end to the cantilever support structure by a coupling 168. To control operation of the tamping heads 135, 136, each cylinder 165 has a respective double acting solenoid control valve 170. By alternately actuating the solenoid valves 170, pressurized air alternatively can be fed to lines 171, 172 for each tamping head cylinder 165, thereby reciprocating the tamping heads into and out of engagement with opposed ends of the electrode plates 12 of an element 35 supported by a carrier at the alignment station. It should also be recognized that electric solenoids may alternatively be used for directly reciprocating the tamping heads. The tamping heads 135, 136 preferably are rapidly operated for five to ten cycles in order to gradually tamp the electrode plates into relatively precise alignment without bending the plates or the lugs thereof. For guiding the plates lugs 16 into relatively precise and even rows, the pressure pad 161 for the tamping head 135 adjacent the lug end of the element 35 is formed with two elongated recesses 174P, 174N for receiving and engaging the respective rows of lugs 16P, 16N during tamping. Upon completion of the tamping operation, the tamping heads 135, 136 are stopped in engagement with opposed ends of the element, the rotary actuator 100b is then reverse actuated to lower the cam arms thereof and release the carrier plunger 95 to its normally biased element engaging position, and the tamping heads 135, 136 and the retaining head 138 are then retracted.

Following plate and lug alignment at the alignment station 121, the element 35 is indexed to the brushing station 122 where the plate lugs 16 are cleaned of contaminents so as to be in condition for fluxing and casting of lug straps in the subsequent production of the battery. The brushing station, as shown in FIGS. 5b and 16–18, includes a cylindrical shaped brush 180 mounted on the drive shaft 181 of an electric motor 182 in parallel close relation to the side of the tracks 62 from which the plate lugs 16 of a transported element 35 extend. The motor 182 is mounted at the upper end of an elevator 184 formed with vertical tracks 185 at its opposite sides that ride on rollers 186 fixed to the frame 60. For raising and lowering the elevator 184, and thereby moving the rotating brush 180 in upward and downward brushing strokes against the plate lugs 16 of an element supported at the brushing station, an air cylinder 188 is fixed to the lower end of the elevator 184 and has a piston rod 188a secured to a mounting plate 190 fixed to the frame 60.

To secure the element 35 in position on the carrier 56 during brushing, an overhead element retaining head 138a and a rear element retaining element 136a are provided, which are substantially similar to the overhead retaining head 138 and rear tamping head 136 at the alignment station 121, and similar reference numerals have been utilized to designate similar parts with the distinguishing suffix "a" added. The retaining heads 138a, 136a may be moved into element engaging positions by the actuation of respective air cylinders 150a, 165a which in this case both are controlled by spring return solenoid valves 154a, 170a.

In order to support the plate lugs 16 during brushing to prevent their bending or misalignment, a lug templet 195 formed with a pair of elongated lug receiving slots 196P, 196N is mounted in depending fashion from the end of a horizontal transfer member 198. The transfer member 198 is supported for rolling movement by pairs of rollers 199 that ride on horizontal tracks 200 carried by the support 144a. For selectively moving the transfer member 198 and lug templet 195, an air cylinder 201 is mounted on the support 144a and has a piston rod 201a connected to the end of the horizontal transfer member 198 by a coupling 202. Operation of the air cylinder 201, by the control of a spring return solenoid valve 204, will move the transfer member 198 and templet 195 between an outwardly extended position (FIG. 16), which permits movement of an element 35 into and out of the brushing station, and a lug support position (FIG. 17) in which the templet 195 engages the end of the element with the plate lugs 16P, 16N extending through and being supported in the templet slots 196P, 196N.

For the purpose of enhancing thorough cleaning of all sides of the protruding plate lugs 16 during brushing, the motor 182 is mounted at the slight angle to the horizontal, such as on the order of 5°, as shown in FIGS. 5a and 17a, and the motor is controlled such that the brush is driven in one rotary direction during an upward brushing stroke and in an opposite rotary direction during the lowering brushing stroke. The motor 182 in this case has an outwardly extended horizontal mounting shaft 205 that can be adjustably positioned in a clamp 206 (FIG. 16) at the upper end of the elevator 184 for positioning the brush at the desired angle to the horizontal. With the brush mounted in such manner, during the upward brushing stroke, brushing action is directed primarily to the lower and right-hand sides of the lugs 16, as illustrated in solid lines in FIG. 17a, while during the downward brushing stroke brushing action is directed primarily to the upper and left-hand sides of the lugs 16, as illustrated in phantom lines in FIG. 17a. All exposed surfaces of the lugs 16 which protrude the support templet 195 are thereby thoroughly cleaned so as to enhance the subsequent casting of lug straps.

After the brushing operation, in the illustrated apparatus, the element is indexed to an alignment after brushing station 123 (FIG. 5b), which is identical to the previous alignment station 121 and similar parts have been given similar reference numerals with the distinguishing suffix "b" added. This station also has a rotary actuator 100c, similar to the actuator 100b at the alignment station, for again at least partially relieving the spring biased engagement of a carrier plunger 95 with the element during the alignment operation. The alignment after brushing station operates to insure that the electrode plate lugs are in relatively precise alignment prior to binding the elements in final assembly form.

Following processing at the alignment after brushing station 123, the element 35 is indexed through the top tape applicator station 124 where strips of tape are simultaneously applied about front, top, and rear faces of opposed ends of the element. The top taping applicator station 124, as shown in FIGS. 5b, 19 and 20a-20c, includes similar tape applicators 210 supported above and on opposite sides of the tracks 62 by respective support plates 211 fixed in outwardly spaced parallel relation to the tracks by mounting bolts 212. Since the top tape applicators 210 are identical in construcion and function, only one need to be described in detail.

Each tape applicator 210 includes a supply roll of tape 214 and a tape applicator arm 215 pivotably mounted on the support plate 211 and biased in an upstream direction against a stop 213 by a spring 216. A length of tape 214 from the supply roll is trained about a guide roll 218, guide members 219, and an applicator roll 220, all carried by the applicator arm 215. For retaining the lower most end of the tape in proper position against the applicator roll 220 with the adhesive side facing upstream, a vacuum plenum 221 is mounted on the arm 215 immediately above the applicator roll 220. As the forward face of the outwardly extending end of a transported element 35 strikes the adhesive side of tape on the applicator roll 220, the tape is applied to the forward face (FIG. 20a) and then along the top of the element as it passes the applicator arm 215. As the element proceeds, resulting tension on the tape 214 will pivot the arm 215 against the biasing force of the spring 216 until a latch 225 carried by the arm 215 engages a fixed latch stop 226 mounted on the support plate 211, as shown in the solid line position in FIG. 20b. Continued forward transport of the element will move it past a pair of buffing roll support arms 228, 229, which are biased by a spring 230 toward a closed position, shown in FIGS. 20a and 20b, and are jointly biased in a rearward direction against a stop 231 by a spring 232.

For severing the tape 214 to the proper length, the latch 225 is pivotably mounted on the applicator arm 215 and can be pivoted in a clockwise direction, as viewed in FIG. 20b and 20c, by actuation of an air cylinder 235 also carried by the arm 215, thereby releasing the arm 215 from the latch stop 226 and permitting the arm to be pivoted further to the right, as viewed in FIG. 20b, under the tension of the tape 214 until the tape engages and is severed by a fixed knife 236 carried by the support plate 211. Continued movement of the element 35 past the second pair of buffing roll support arms 228, 229 urges the tape into secure contact with the forward, top, and rear faces of the element, as shown in FIG. 20c.

Following passage of the element 35 through the top tape applicator station 124, the element is indexed through the bottom tape applicator station 125 where strips of tape 214a are applied about the front, bottom and rear faces of the element to completely encircle and bind the opposed ends of the element in final assembly form. The bottom tape applicator station 125 includes bottom tape applicators 210a that are located under the opposite extended ends of a transported element 35, but otherwise are substantially identical to the top tape applicators 210 in construction and function, as illustrated in FIGS. 20a-20c, and similar reference numerals have been used to designate similar parts with the distinguishing suffix "a" added.

Because the bottom tape applicator arm 215a and buffer roller support arms 228a, 229a apply upwardly direct forces to the underside of the passing element 35, a retaining plate 240 is mounted directly above the line of travel of an element passing through the bottom tape applicator station. The retaining plate 240 is adjustably supported by threaded bolts 241 suspended from cross-members 242 fixed between the upper ends of the supports 211a. The retaining plate 240 preferably is positioned so that the upper side of a transported element slidingly engages the retaining plate such that the retaining plate serves as a reactionary member to the upwardly directed forces exerted on the element 35 by the arms 215a, 228a, 229a of the bottom tape applicator 210a.

It will be appreciated that following passage of an element 35 through the bottom tape applicator station 125, strips of tape 214, 214a will encircle the opposed ends of the element, as illustrated in FIG. 3, retaining the element in final assembly form for subsequent handling and utilization in an automated battery production line. In order to facilitate recognition of plate polarity during such handling, the tape 214 applied by the top tape applicators 210 preferably has an indicia denoting the polarity of the immediately adjacent upper row of plate lugs 16N and the tape 214a applied by the lower tape applicators 210a has an indicia for denoting the polarity of the lugs 16P of the adjacent lower row. Preferably red-colored tape is applied to the side of the element on which the positive plate lugs 16P are located and black tape is applied to the side of the element on which the negative polarity plate lugs 16N are located. Alternatively, tape with a series of "+" signs, the word "positive," or the like, could be used to indicate the positive plate lug side of the element and tape with a series of "−" signs, the word "negative," or the like, could be used to indicate the negative plate lug side.

Following passage of an element through the bottom tape applicator station 125, the completed element 35 is indexed to a transfer and discharge station 250, illustrated in FIGS. 5c and 23-26, where the element is removed from the chain conveyor 55 and positioned in predetermined orientation onto the multiple lane exit conveyor 11 disposed at a right angle to the chain conveyor. The transfer and discharge station 250 in this instance includes a first element transfer mechanism 251 (FIGS. 23-24) for successively removing a horizontally supported element 35 from a conveyor carrier 56 and locating the element in upright position at the side of the conveyor tracks 62 with the plates lugs 16 on the top side of the element. A second transfer mechanism 252 (FIGS. 25-26) then engages the unloaded element 35 held by the first transfer mechanism 251, transfers the element to a location beyond the end of the chain conveyor 55, rotates the element 90° about a vertical axis, and positions the element onto a selective one of the lanes of the exit conveyor 11. The illustrated exit conveyor 11 has two lanes A and B, which each comprise a power driven conveyor belt 253, or the like, and side rails 257 for supporting elements 35 on the belts in upright condition during their travel along the conveyor.

The first element transfer mechanism 251 has an element clamping head 254 at the end of a pivot arm 255 which is mounted on a shaft 256 fixed to a frame gusset plate 258. The clamping head 254 includes a pair of jaws 259 pivotably supported on pins 260 carried in a yoke-shaped end 255a of the pivot arm 255. The lower jaw 259 (as viewed in FIGS. 23 and 24) is shorter in length than the upper jaw since it engages only the end of the element protruding from the carrier 56. To facilitate reliable gripping of the element, the jaws 259 both have resilient gripping pads 259a.

To actuate the clamping jaws 259 of the clamping head 254, an air cylinder 261 is fixed to the back side of the end 255a of the pivot arm 255 and has a piston rod 261a with a yoke 262 secured to the outer end thereof by a screw 264. The yoke 262 carries a cam rod 265 adapted for cooperation with cam surfaces 266 formed on respective portions of the jaws 259 immediately adjacent opposing sides of the cam rod 265. By the actuation of cylinder 261, the piston rod 261a, yoke 262, and cam rod 265 can be moved to the right, as viewed in FIG. 23, engaging the jaw cam surfaces 266 to pivot the jaws 259 toward their closed element engaging position, as shown in solid lines. Reverse actuation of the cylinder 261 will move the cam rod 265 in an outward direction against the cam surfaces 266, forcing the clamping jaws 259 to pivot in opposite opening directions, as shown in phantom in FIG. 23.

Upon engagement of an element 35 by the clamping head 254 at the transfer and discharge station 250, the element engaging plunger 95 of the carrier 56 may be engaged to release the element in the carrier. For this purpose, a rotary actuator 100d of the type previously described is provided for engaging and moving the carrier cam plate 102 to a plunger releasing position in timed relation with the engagement of the element by the clamping head 254.

Following element engagement by the clamping head 254 and element release by the carrier plunger 95, the clamping head arm 255 is pivoted about the shaft 256 from the upright position in which the clamping head 254 and engaged element 35 are horizontally disposed at the conveyor 55, as shown in solid lines in FIG. 23, to a 90° pivoted or unloaded position in which the clamping head 254 and element 35 are disposed in upright condition to the side of the conveyor 55, as shown in phantom in FIG. 23. To effect such pivotable movement of the clamping head 254, an air cylinder 270 is pivotably mounted on a support flange 271 fixed to the frame 60 and has a piston rod 270a pivotably secured to the backside of the clamping head 254.

The second element transfer mechanism 252 has a clamping head 254a, similar to the clamping head 254 of the first element transfer mechanism 251, for engaging and removing the element 35 from the first transfer mechanism head 254 following unloading from the conveyor 55. The clamping head 254a in this instance has clamping jaws 259a of equal length and is mounted on the end of the rod 275a of a multi-motion actuator 275. The actuator 275, which may be of a known type, includes a first air cylinder 275b for extending and retracting the piston rod 275a and a second double acting air cylinder 275c for selectively rotating the piston rod. The double acting air cylinder 275c in this instance has a piston mounted rack 275d for driving a pinion 275e mounted at the upper end of a splined shaft 275g, and the cylinder 275b has a piston 275f which is longitudinally movable relative to the splined shaft for extending and retracting the rod 275a. For sensing the rotated position of the clamping head 254a, a cam 278 in this case is carried on an upwardly extending end of the splined shaft 275g for engaging respective switches 279, 280 located adjacent the end of the actuator. With the actuator 275 supporting the clamping head 254a in a raised position above an unloaded element 35, as shown in FIG. 25, the jaws 259a of the clamping head 254a may be actuated to engage the upper half of the element supported by the clamping head 254, which may then release the element.

For moving the second transfer mechanism clamping head 254a and the element 35 held therein from such unloaded position to a position over a selected lane of the multiple lane exit conveyor 11, the actuator 275 is mounted on a lane shift carriage 281, which in turn is supported on a transfer carriage 282. The lane shift carriage 281 comprises an elongated horizontal plate having tracks 284 on its top and bottom sides which are supported between pairs of rollers 285 mounted on the transfer carriage 282 so as to permit horizontal movement of the lane shift carriage 281 relative to the transfer carriage 282. The actuator 275 is fixed to an upstanding mounting plate 288 (FIG. 26) secured to the lane shift carriage 281 by bolts 289. To move the lane shift carriage 281 relative to the transfer carriage 282, a cylinder 290 is mounted in a horizontal opening 291 in the transfer carriage 282 with one end of the cylinder 290 being fixed to the lane shift carriage 281 by a bracket 292 and its piston rod 290a fixed to the transfer carriage 282 by a coupling 294.

The transfer carriage 282 has pairs of rollers 295 which ride on tracks 296 of a horizontal channel 298 that is mounted on upward extensions 300, 301 of the frame 60 (FIG. 5c). The horizontal channel 298 extends from a location over the first transfer mechanism 251 to a location over the exit conveyor 11. For moving the transfer carriage 282 and the lane shift carriage 281 supported thereon between such locations, a rodless cylinder 305 is mounted on the horizontal channel 298 and has a piston connected to the transfer carriage 282 by a coupling 306 (FIG. 25). To limit movement at the opposite ends of travel of the transfer carriage 282 on the channel 298, adjustable stops 308 are mounted at the ends of the channel 298.

In order to permit relatively precise location of the clamping head 254a with respect to the lanes of the discharge conveyor 11 during initial setup of the transfer mechanism 252, the horizontal channel 298 is pivotably mounted on pin 310 carried on top of the upstanding suppport 300 (FIG. 5c) and the elevation of the other end of the channel may be selectively adjusted by a screw 311 carried in gusset plates 312 mounted on the upstanding support 301. Upon desired positioning of the channel 298, the channel is rigidly secured to the gusset plates 312 by a bolt 314 which is contained within elongated gusset plate slots 315 (FIG. 25). To insure vertical positioning of the clamping head 254 notwithstanding slight pivotable adjustment of the horizontal channel 298, the mounting plate 288 for the clamping head support actuator 275 is formed with angled slots 318 which permit slight pivotable adjustment of the mounting plate 288 on the lane transfer carriage 281.

The second transfer mechanism 252 may be operated to transfer an unloaded element 35 from the clamping head 254 of the first transfer mechanism 251 to either lane A or lane B of the exit conveyor 11. By the actuation of the rodless cylinder 305, the transfer carriage 282, the lane shift carriage 281 mounted thereon, the clamping head 254a, and the engaged element 35 may be moved from the unloaded position adjacent the conveyor 55 to a position over the exit conveyor 11. During such transfer, or upon reaching a position over the exit conveyor 11, the clamping head 254a may be rotated 90° in either direction by actuation of the cylinder 275c of the multi-motion actuator 275 to position the element 35 parallel to the exit conveyor with the rows of common polarity plate lugs oriented on desired sides of the exit conveyor. The clamping head 254a then may be lowered to position the element 35 onto the exit conveyor 11 by the actuation of cylinder 275b of the multi-motion actuator 275. If the second transfer mechanism 252 is to transfer completed elements onto lane A of the exit conveyor 11, the lane shift carriage 281 will have been moved to its far left-hand position on the transfer carriage 282, as viewed in FIGS. 5c and 26, by the actuation of the cylinder 290 retracting its piston rod 290a, and the lane shift carriage 281 will remain in such position on the transfer carriage 282 throughout the cycle of operation.

In the event the second transfer mechanism 252 is to transfer elements 35 onto lane B of the exit conveyor 11, during each cycle of operation in which the transfer carriage 282 is moved outwardly to the exit conveyor, the cylinder 290 is actuated to extend its rod 290a and force the lane shift carriage 281 to its far right-hand position on the transfer carriage 82, which will cause the clamping head 254 and an element 35 held therein to be located over the more outwardly disposed lane B when the transfer carriage 82 reaches the outer stop 308, thereby permitting the element to be lowered onto that lane. During return movement of the transfer carriage 282, the cylinder 290 is reverse actuated to return the lane shift carriage 281 to its left-hand position such that the clamping head 254a will be properly located for receiving an unloaded element during the succeeding cycle. It can be seen, therefore, that, by appropriate control, the transfer mechanism 252 may supply elements to lane A of the exit conveyor 11 during each cycle of operation, or to lane B of the exit conveyor during each cycle of operation, or to both lanes A and B during alternate cycles or in other sequences, as desired.

In carrying out another aspect of the invention, a system of element assemblers 10 of the foregoing type is provided for delivering a uniform supply of assembled and processed elements to the multiple lane exit conveyor 11 notwithstanding an interruption in the productive output of one of the assemblers. In the illustrated embodiment, as diagrammatically shown in FIG. 1, two identical element assemblers 10 (designated as element assemblers Nos. 1 and 2) are provided for supplying elements to the exit conveyor 11. During normal operation, the element transfer mechanism 252 for one of the element assemblers 10, preferably assembler No. 1, would be controlled to continuously transfer completed elements onto lane A of the exit conveyor 11 and the transfer mechanism 252 of the other element assembler 10 (i.e. element assembler No. 2), would be controlled to continuously transfer completed elements onto lane B of the exit conveyor. In the event operation of one of the element assemblers should break down, or be interrupted in operation for any reason, the other element assembler may then be controlled to alternately transfer elements to lanes A and B so as to continue to maintain a uniform supply of elements to both lanes, which may be essential for continued operation of an automated battery production line.

For insuring that the element assembler No. 2 has not previously delivered an element onto lane A of the exit conveyor which would impede the transfer of an element by element assembler No. 1, an electric eye 325 is trained across lane A at an angle that will sense the presence of an element on lane A at a point immediately upstream of where elements are positioned onto the exit conveyor by element assembler No. 1. In the event no element is sensed at such upstream location, an air cylinder controller stop pin 326 is permitted to be actuated so as to block passage of an element into the loading area of the transfer mechanism 252 of element assembler No. 1, which then is actuated to carry out the transfer operation.

Hence, it will be appreciated that the exit conveyor 11 may transfer completely assembled elements ready and suitable for reliable utilization in subsequent operating stations of an automated battery production line. For example, the exit conveyor 11 may deliver the assembled elements to an apparatus, such as shown in Schaumburg et al. application Ser. No. 380,785, now U.S. Pat. No. 4,534,401 which is adapted to automatically cast lug straps onto the elements. To accumulate the elements 35 into aligned pairs on the adjacent lines A and B of the exit conveyor for utilization in such cast-on-strap apparatus, in the illustrated embodiment, a pair of air cylinder operated stop pins 328 are disposed on opposite sides of the exit conveyor 11. Upon sensing the presence of an element adjacent each stop pin, such as by an appropriate electric eye sensor, the stop pin cylinders may be actuated to withdraw the pins 328 and permit passage of the accumulated pair of elements along the exit conveyor.

In keeping with the invention, control means is provided for coordinating each of the operations of the assemblers 10 in order to permit automatic and optimized element assembly, processing and transfer. As diagrammatically illustrated in FIG. 27, the control means includes a Master Controller 330 which may comprise a conventional microprocessor-based programmable controller, such as a Gould Modicon 584 Programmable Controller, having a processor portion 331 and a memory portion 332 appropriately programmed to effect the sequential operations as hereinafter described. The Master Controller 330 in this case is adapted to communicate with and directly control functions of each of the operating mechanisms. It will be appreciated that suitable limit switches or other sensing devices of a known type may be employed to detect the limits of movement of the various mechanisms and provide an output signal for utilization by the Master Controller 330 for controlling subsequent functions. In each instance the Master Controller 330 communicates through conventional input and output modules which convert incoming signals from the sensing devices associated with the apparatus to signal levels compatible with the controller and which convert output signals of the controller to signal levels compatible with the apparatus.

In view of the foregoing, a programmed operating sequence of the illustrated apparatus, under control of the Master Controller 330, is as follows. The element assembly apparatus 19 can be operated under the control of the Master Controller 330, as described in Sabatino et al. application Ser. No. 381,227, to cyclically assemble battery cell elements and to deliver such elements in intermediate folded condition to the intermediate fold station 24 (FIG. 5a). During element transfer to the intermediate fold station, the loading arm 65 of the element transfer and processing apparatus 20 is in a lowered position with an empty element carrier 56 located thereon (FIG. 5a). Upon the intermediate fold carriage 32a reaching the intermediate fold station 24, the plunger 95 of the carrier 56 on the loading arm 65 is opened by the actuation of rotary actuator 100, the loading arm 65 is raised to its horizontal position to locate the carrier 56 in element receiving position between the side channels 42 of the intermediate fold carriage 32a (FIG. 6), and the carrier plunger 95 is released by reverse actuation of the rotary actuator 100, permitting the plunger 95 to engage the element under the biasing force of the spring 98a and compress the element 35 into final size. The side channels 42 of the intermediate fold carriage are then moved outwardly by the actuation of cylinders 44 (FIG. 7a), and the intermediate fold carriage 32a returned to the pre-fold station 23 by actuation of cylinder 39. The conveyor motor 86 is then energized to index the carrier 56 and element 35 supported thereon to the inspection and manual unload station 120 while simultaneously indexing the next empty carrier 56 onto the loading arm 65, which is then returned to its lowered position by the reverse actuation of the cylinder 72.

Upon indexing of the element 35 to the inspection station 120, an electric eye 130 will sense whether any portion of the element improperly extends above the level of the electric eye beam, and if so, an appropriate sensor will be activated to alert the machine operator or shut down the machine. Upon such sensor activation, or an operator otherwise noticing a defective element in the carrier 56 at the inspection station 120, the operator may open the element engaging plunger 95 of the carrier 56 by manually depressing the palm button 132 to actuate the rotary actuator 100a. The element may then be removed from the carrier and inspected, and if the problem can be corrected, replaced in the carrier for subsequent processing.

After the inspection station 120, the element 35 is indexed to the alignment station 121 (FIGS. 5b and 13-15). Upon reaching the alignment station 121, the overhead clamping head 138 is lowered into element retaining position by actuation of the cylinder 150, the carrier plunger 95 is opened to a position loosely supporting the element on the carrier by the actuation of the rotary actuator 100b, and the tamping heads 135, 136 then are reciprocated into and out of engagement with the ends of the element by the alternate actuation of cylinders 165 to gradually tamp the electrode plates 16 of the element 35 into relatively precise alignment. Upon completion of a predetermined number of cycles of operation of the tamping heads 135, 136, the tamping heads are stopped in engagement with opposed ends of the element, the carrier plunger 95 is released to its normally biased element engaging position by the reverse actuation of rotary actuator 100b, and the retaining head 138 and tamping heads 135, 136 retracted by operation of their respective air cylinders 150, 165 to permit indexing of the element to the brushing station 122.

Upon the element reaching the brushing station 122 (FIGS. 5b and 16-18), the overhead and rear clamping heads 138a, 136a are moved into element engaging position by actuation of cylinders 150a, 165a, and the lug template plate 195 is moved into lug supporting position adjacent the opposite end of the element by the actuation of cylinder 201 (FIG. 17). The brush motor 182 is then actuated to drive the brush 180 in a counterclockwise direction, as viewed in FIG. 17, as it is raised through an upward brushing stroke by the actuation of cylinder 188, thereby thoroughly brushing and cleaning the lower and right-hand sides of the lugs 16, as viewed in FIG. 17a. Upon reaching the top of the upward brushing stroke, operation of the motor 182 is reversed to drive the brush 180 in a clockwise direction, as viewed in FIG. 17, and the brush is moved through its downward brushing stroke by the reverse actuation of cylinder 188 to thoroughly clean the upper and left-hand sides of the lug 16, as viewed in FIG. 17. Upon completion of the downward brushing stroke, the brush motor 182 is deenergized, the lug template plate 195 is moved outwardly away from the element by the reverse actuation of cylinder 201, and the clamping heads 138a, 136a retracted by reverse actuation of cylinders 150a, 165a. The element 35 then is indexed to the alignment after brushing station 123, which is identical in operation to the alignment station 121, and any slight lug misalignment that may have occurred from brushing is corrected so that the element is in condition to be bound in its final assembled form.

Following completion of the alignment after brushing station operation, the element 35 is indexed through the top tape applicator station 124 (FIGS. 5b, 19, and 20a-20c) where strips of tape 214 having color or other indicia corresponding to the polarity of the adjacent upper row of plate lugs 16N are applied about front, top, and rear faces of opposed ends of the element. Since the conveyor 55 is intermittently indexed between the successive stations of the element transport and process apparatus 20, it will be understood that the element 35 may be moved midway through the top tape applicator station 124 during indexing from the alignment after brushing station 123, is then halted to permit cycling of the other process stations, and then moved through the remainder of the top tape applicator station upon being indexed to the bottom tape applicator station 125. As the element passes through the top tape applicators 210, actuation of the cylinder 235 is controlled by the Master Controller 330 for effecting cutting of the tape 214 in response to appropriate sensing of the element reaching a predetermined position along its path of travel. The tape roll 214, tape applicator arm 215, and buffing arms 228, 229 otherwise function in response to movement of the element through the station independently of the Master Controller. The element is similarly processed through the bottom tape applicators 210a (FIGS. 5c, 21, and 22a-22c).

Following passage of the element through the bottom tape applicator station 125, the completed element 35 is indexed to the transfer and discharge station 250 (FIGS. 5c and 23-26). Upon reaching such station, the clamping head 254 of the first transfer mechanism 251 is pivoted into element receiving position by the actuation of the cylinder 270 (FIG. 23), the clamping jaws 259 are moved into element engagement by the actuation of cylinder 261, and the carrier plunger 95 released by the disactuation of the rotary actuator 100d. The clamping head 254 then is pivoted 90° by the reverse actuation of cylinder 270 to locate the element 35 in an upright unloaded position with the plate lugs thereof on the upper end.

The clamping head 254a of the second transfer mechanism 252 may then be lowered into element receiving position by the actuation of cylinder 275b of the multimotion actuator 275, and the jaws 259a of the clamping head 254a pivoted into element engagement by the actuation of cylinder 261a. The clamping head 254 then releases the element by reverse actuation of cylinder 261, and the element is transferred to a position over the exit conveyor 11 by the actuation of the rodless cylinder 305, which moves the transfer carriage 282 and the lane shift carriage 281 and clamping head 254a carried thereon. During such transfer, or upon reaching a position over the exit conveyor 11, the clamping head 254a is rotated 90° in the desired direction for properly orienting the rows of common polarity plate lugs of the element with respect to the exit conveyor by actuation of the cylinder 275c of the multi-action actuator 275, and the element then is lowered into position on the conveyor by actuation of cylinder 275b. If the element is to be located on lane A of the exit conveyor 11, the lane shift carriage 281 will have been moved to its far left-hand position on the transfer carriage, as viewed in FIGS. 5c and 25, by the actuation of cylinder 290, and the lane shift carriage 281 will remain in such position on the transfer carriage 282 throughout the cycle of operation. In the event the element is to be positioned on lane B of the exit conveyor 11, during transfer of the carriage 282 to the exit conveyor 11, the cylinder 290 is actuated to move the lane shift carriage 281 to its right-hand position on the transfer carriage 282. During return movement of the transfer carriage 282 to its element receiving position at the conveyor 55, the carriage is returned to its left-hand position by the reverse actuation of cylinder 290. It will be appreciated that the operation of the transfer mechanism 252 may be controlled by the Master Controller 330, in response to conditions on the exit conveyor 11, such as the electric eye 325 sensing a clear condition for element transfer and the stop pin 326 being extended to prevent the conveyance of an element into the loading zone of the transfer mechanism.

From the foregoing, it can be seen that the apparatus of the present invention is adapted for the automatic and reliable handling of battery cell elements during their assembly and subsequent processing and is particularly adapted for use in a completely automated battery production line. The apparatus is operable to efficiently process assembled elements, bind them in assembled form, and position the assembled elements onto a plurality of run-out conveyors in predetermined orientation for reliable supply to subsequent stations in a battery production line. Moreover, a plurality of element assembly and process lines may be combined into a system which can be controlled such that a continuous, uniform supply of assembled elements may be provided to a plurality of run-out conveyors, notwithstanding breakdown of one or more of the lines.

What is claimed is:

1. An apparatus for transferring and processing battery cell elements having a plurality of electrode plates each plate having a lug at a common end and being separated by an insulating material, comprising power driven conveyor means having a loading station, a discharge station, and a plurality of longitudinally spaced element carriers supported for movement along a defined path between said loading and discharge stations; said loading station including means for successively transferring elements to carriers while located at said loading station; said carriers each having means for positively engaging an element at said loading station, supporting and carrying the engaged element for movement along said path, and for releasing the element at said discharge station; said discharge station including means for successively engaging elements in said carriers while located at said discharge station and transferring said elements away from said discharge station; and a plurality of processing stations located along said path of movement for simultaneously processing elements carried by a plurality of said carriers.

2. The apparatus of claim 1, in which said conveyor means includes drive means for intermittently indexing said carriers and the elements carried thereby to respective of said stations in predetermined timed intervals.

3. The apparatus of claim 2, in which said conveyor means includes an endless chain upon which said carriers are mounted, track means for supporting said chain and the carriers mounted thereon for movement along said path, and drive means for driving said chain.

4. The apparatus of claim 2, in which said processing stations include an alignment station having means for moving the electrode plates of an element into predetermined alignment upon an element being indexed to said alignment station.

5. The apparatus of claim 4, in which said carriers each support an engaged element with the lug end thereof extending outwardly from one side of the carrier and the opposed end of the element extending outwardly from the opposite side of the carrier, and said alignment station includes a pair of tamping heads mounted adjacent said outwardly extending ends of an element indexed to said alignment station, and means for reciprocating at least one of said tamping heads into repeated engagement with the adjacent end of the element at said alignment station for gradually moving the electrode plates of the element into relatively precise determined alignment.

6. The apparatus of claim 5, including means for simultaneously reciprocating both said tamping heads into engagement with opposed ends of an element indexed to said alignment station.

7. The apparatus of claim 6, in which said alignment station includes an element retaining head, and means for moving said retaining head into engagement with an element indexed to said alignment station for retaining the element in place on a carrier upon which it is supported during operation of said tamping heads.

8. The apparatus of claim 17, including means for disengaging the element engaging means of each carrier with an element at said alignment station during operation of said tamping heads.

9. The apparatus of claim 7, in which said element engaging means of each carrier includes a spring biased plunger mounted for movement between an open element receiving position and a released spring biased element engaging position, and means for at least partially relieving the biasing engagement of the plunger with an element at said alignment station during operation of said tamping heads.

10. The apparatus of claim 6, including support means for supporting said tamping heads for reciprocating horizontal movement on opposite sides of an element indexed to said alignment stations, and support means for supporting said retaining head for vertical element engaging and retracting movement over an element indexed to said alignment station.

11. The apparatus of claim 5, in which the tamping head adjacent the lug end of an element indexed to said alignment station has an element engaging end formed with lug receiving recesses for guiding the electrode plate lugs of the element into aligned rows.

12. An apparatus for transferring and processing battery cell elements having a plurality of electrode plates, each plate having a lug at a common end and being separated by an insulating material, comprising power driven conveyor means having a loading station, a discharge station, and a plurality of longitudinally spaced element carriers supported for movement along a defined path between said loading and discharge stations; said carriers each having means for positively engaging an element at said loading station, supporting and carrying the engaged element for movement along said path, and for releasing the element at said discharge station; a plurality of processing stations located along said path of movement for simultaneously processing elements carried by a plurality of said carriers; said conveyor means including an endless chain upon which said carriers are mounted, track means for supporting said chain and the carriers mounted thereon for movement along said path, and drive means for said chain for intermittently indexing said carriers and the elements carried thereby to respective of said stations in predetermined timed intervals; a loading arm pivotably supported at said loading station; means for training said chain along said loading arm and track means so that said carriers may be successively indexed onto said loading arm and then along said track; and means for cyclically pivoting said arm from a lowered position supporting a carrier in spaced relation below an element at said loading station and a raised position locating a carrier in element receiving and engaging position.

13. The apparatus of claim 13, in which said element engaging means of each carrier includes a spring biased plunger mounted for movement between an open element receiving position and a released element engaging position, and means for moving said plunger to said open position upon indexing of the carrier onto said loading arm and releasing said plunger to element engaging position following pivoting of said arm to said element receiving position.

14. The apparatus of claim 13, in which said loading arm is pivotably mounted in rearwardly extending relation to an upstream end of said track means, and said carrier plunger opening and releasing means is carried on said loading arm.

15. The apparatus of claim 13, in which each said carrier has a cam follow means fixed to said plunger, and said plunger opening and releasing means is a rotary actuator having cam arm means which upon actuation of said actuator is engageable with the cam 16. An apparatus for transferring and processing battery cell elements having a plurality of electrode plates, each plate having a lug at a common end and being separated by an insulating material, comprising power driven conveyor means having a loading station, a discharge station, and a plurality of longitudinally spaced element carriers supported for movement along a defined path between said loading and discharge stations; means for successively delivering to said loading station relatively loosely assembled elements; said carriers each have means for engaging a loosely assembled element at said loading station, compressing the element into final assembled size, supporting and carrying the engaged element for movement along said path, and releasing the element at said discharge station; and a plurality of processing stations located along said path of movement for simultaneously processing elements carried by a plurality of said carriers, said processing stations including means for binding said element in said final assembled size as the element is moved along said path.

17. The apparatus of claim 16, in which said carriers each support an element with opposed ends thereof extending outwardly of said carrier, and said binding means includes means for encircling said element with binding strips.

18. The apparatus of claim 17, in which said processing stations include a top tape applicator station having means for applying strips of tape about forward, top, and rear faces of opposed ends of an element moved through said station, and a bottom tape applicator station having means for applying strips of tape about forward, bottom, and rear faces of the element moved through said station.

19. The apparatus of claim 18, in which said top tape applicator station has tape applicators disposed on opposed sides of said conveyor means for simultaneously applying strips of tape to opposed ends of an element moved through said station, and said bottom tape applicator station has tape applicators disposed on opposite sides of said conveyor means for simultaneously applying strips of tape to opposed ends of an element moved through said station.

20. The apparatus of claim 18, in which said bottom tape applicator station includes element retaining means disposed adjacent an element located at said bottom tape applicator station for retaining the element in place on the carrier upon which it is supported during taping at said station.

21. The apparatus of claim 22, in which said element retaining means is a plate disposed in close relation adjacent a central portion of an element located at said bottom tape applicator station whereby the element is interposed between said retaining plate and carrier during taping of the opposed element ends at said station.

22. An apparatus for transferring and processing battery cell elements having a plurality of electrode plates, each plate having a lug at a common end and being separated by an insulating material, comprising power driven conveyor means having a loading station, a discharge station, and a plurality of longitudinally spaced element carriers supported for movement along a defined path between said loading and discharge stations; said carriers each having means for positively engaging an element at said loading station, supporting and carrying the engaged element for movement along said path, and for releasing the element at said discharge station; and a plurality of processing stations located along said path of movement for simultaneously processing elements carried by a plurality of said carriers, said processing stations including a brushing station comprising a rotatable brush mounted for movement in a plane adjacent the lug end of an element indexed to said brushing station, means for rotatably driving said brush, and means for moving said brush through a brushing stroke in contact with lugs of an element at said brushing station.

23. The apparatus of claim 22, in which said brush moving means includes means for moving said brush in a forward brushing stroke primarily directed across commonly oriented sides of the electrode plate lugs of an element at said brushing station and then a return brushing stroke primarily directed across opposite commonly oriented sides of the plate lugs.

24. The apparatus of claim 23, in which said brush driving means drives said brush in one rotary direction during said forward brushing stroke and in an opposite rotary direction during said return brushing stroke.

25. The apparatus of claim 23, including means for mounting said brush with a brushing surface thereof at a selected angle to an element indexed to said brushing station such that during said forward brushing stroke brushing is directed primarily against the sides of the lugs joined at commonly oriented corners of the lugs and during the return brushing stroke brushing is directed primarily against the sides of the lugs joined at opposite commonly oriented corners of the lugs.

26. The apparatus of claim 23, in which said carriers each support an element with the lugs thereof in horizontal rows at one side of the element, means for mounting said brush with a brushing surface thereof at a relatively small angle to the horizontal, and said brush moving means moves said brush upwardly in a vertical plane during one of said brushing strokes such that brushing is directed primarily against the bottom and one commonly oriented adjacent side of the lugs, and said brush moving means moves said brush in a downwardly vertical plane during the other brushing stroke such that brushing is directed primarily against the top and opposite commonly oriented adjacent side of the lugs.

27. The apparatus of claim 26, in which said brush mounting means supports said brush with the brushing surface thereof at an angle of about 5° to the horizontal.

28. The apparatus of claim 22, in which said brushing station includes selectively positionable electrode plate lug support means for supporting lugs of an element indexed to said brushing station against bending during brushing, and means for moving said plate lug support means into lug supporting position upon indexing of an element to said brushing station.

29. The apparatus of claim 28, in which said lug support means is a templet plate having apertures through which said lugs extend and are supported during brushing, and said lug support moving means is operable to move said templet plate from an outwardly extended position that permits indexing of an element to said brushing station and a lug support position adjacent the lug end of an element with the lugs extending through said lug apertures.

30. The apparatus of claim 29, in which said lug apertures are elongated slots for supporting rows of plate lugs of an element.

31. The apparatus of claim 28, in which said brushing station includes an element engaging retaining head, and means for moving said retaining head into engagement with an element indexed to said brushing station for retaining the element in place on a carrier upon which it is supported during brushing.

32. An apparatus for transferring and processing battery cell elements having a plurality of electrode plates, each plate having a lug at a common end and being separated by an insulating material, comprising power driven conveyor means having a loading station, a discharge station, and a plurality of longitudinally spaced element carriers supported for movement along a defined path between said loading and discharging stations, said carriers each having means for positively engaging an element at said loading station, supporting the element in a horizontally disposed relation with opposed ends extending outwardly from the sides of the carrier, carrying the element for movement along said path, and releasing the element at said discharge station; a plurality of processing stations located along said path of movement for simultaneously processing elements carried by a plurality of said carriers; and means for monitoring whether each element is properly supported by its respective carrier by sensing whether the element extends upwardly from said carrier beyond a predetermined level as the element is carried along said path.

33. The apparatus of claim 32, including an element inspection station, said monitoring means being disposed at said element inspection station, and said element inspection station including manually actuated means fdor disengaging an element in a carrier indexed to said inspection station to permit removal, inspection, and replacement of the element.

34. An apparatus for transferring and processing battery cell elements having a plurality of electrode plates, each plate having a lug at a common end and being separated by an insulating material, comprising power driven conveyor means having a loading station, a discharge station, and a plurality of longitudinally spaced element carriers supported for movement along a defined path between said loading and discharge stations; said carriers each having means for positively engaging an element at said loading station, supporting and carrying the engaged element for movement along said path, and for releasing the element at said discharge station; a plurality of processing stations located along said path of movement for simultaneously processing elements carried by a plurality of said carriers; an exit conveyor having a plurality of element carrying lanes; and said discharge station including transfer means for successively removing elements from said conveyor means upon movement of the elements to said discharge station and for positioning said elements on selective lanes of said exit conveyor.

35. The apparatus of claim 34, in which said carriers each support an element with the lug end thereof extending outwardly from one side of the carrier and an opposed end extending outwardly from the opposite side of said carrier; and said transfer means includes means for successively engaging said opposed end of said element upon indexing to said discharge station, removing the element from the carrier in which it is supported, and locating the element in upright position on the exit conveyor with the lug end on the top side.

36. The apparatus of claim 35, in which said exit conveyor is disposed at a determined angle to said conveyor means path, and said transfer means includes means for successively positioning removed elements in an upright condition with the lugs on the top side, then rotating the element said determined angle about a vertical axis of the element, and positioning the rotated element on said exit conveyor.

37. The apparatus of claim 36, in which said transfer means is selectively operable for rotating an element in either direction about said vertical axis depending upon the desired orientation of the plate lugs of common polarity upon positioning of the element on said exit conveyor.

38. The apparatus of claim 36, in which said transfer means includes a first transfer mechanism for engaging the opposed end of an element indexed to said discharge station and pivoting the element to an unloaded upright position with the lugs thereof on the top side, and a second transfer mechanism for engaging the unloaded element from said first transfer mechanism, moving the element outwardly beyond an end of said conveyor means, rotating the element said determined angle about a vertical axis thereof, and positioning the rotated element onto said exit conveyor.

39. The apparatus of claim 38, in which said exit conveyor has a plurality of element receiving and conveying lanes, and said second transfer mechanism includes lane shift means for establishing a selected exit conveyor lane upon which the element is to be positioned.

40. The apparatus of claim 39, in which said second transfer mechanism includes an element clamping head, a lane shift carriage supporting said clamping head, and a transfer carriage supporting the lane shift carriage; and means for cyclically moving the transfer carriage, lane shift carriage, and clamping head carried thereby from a discharge station position and an exit conveyor position; and selectively operable means for moving the lane shift carriage relative to the transfer carriage for establishing a selected lane of the exit conveyor over which the clamping head is to be disposed upon movement of said transfer carriage to said exit conveyor position.

41. A system for assembling and processing battery cell elements comprising an element assembly apparatus and an element transfer and processing apparatus, said element assembly apparatus including means for assembling battery cell elements having a plurality of electrode plates which have plate lugs extending from a common end thereof and are separated by an insulating material; means for successively delivering said assembled elements to a loading station at said element transfer and processing apparatus; said element transfer and processing apparatus including power driven conveyor means having a plurality of element carriers supported for movement along a defined path between said loading station and a discharge station; said carriers each having means for positively engaging an element at said loading station, supporting and carrying the engaged element for movement along said path, and releasing the element at said discharge station; and a plurality of processing stations located along said path for processing elements carried by said carriers during movement along said path.

42. The system of claim 41, in which said element assembly apparatus includes means for assembling battery cell elements having a plurality of electrode plates of alternating polarity separated by a single interleaved separator sheet, said assembled element delivering means including a carriage having a pair of transversely spaced and relatively movable sides for supporting an element between its opposed ends, said element engaging means of each carrier being operable to engage an element delivered by said carriage to said loading station at a central location between said carriage sides, and means for transversely moving said carriage sides to an open element releasing position upon element engagement by a carrier.

43. The system of claim 42, in which said processing stations include an alignment station having means for moving the electrode plates in an element into predetermined alignment upon an element being moved to said alignment station; a brushing station comprising a rotatable brush mounted for movement in a plane adjacent the lug end of an element moved to said alignment station, means for rotatably driving said brush, and means for moving said brush through a brushing stroke in contact with lugs of an element at said brushing station; and a binding station for binding the element in assembled and processed condition.

44. The system of claim 41, in which said element assembling means is operable to successively produce relatively loosely assembled elements, and said carriers each have means for engaging a loosely assembled element at said loading station and compressing the element into final assembled size, and said processing stations include means for binding said element in said final assembled size as the element is moved along said path.

45. A system for assembling and processing battery cell elements comprising a plurality of element assemblers and an exit conveyor having a plurality of element conveying lanes located at a common end of said element assemblers, said element assemblers each including means for assembling and processing cell elements and means for transferring assembled cell elements onto a selected one of said exit conveyor lanes such that said lanes each are supplied with similar numbers of assembled elements, and in the event of the interruption of operation of one of said element assemblers, the transfer means of the other element assemblers being selectively operable to continue to supply similar numbers of assembled cell elements to each lane of said exit conveyor.

46. The system of claim 45, in which said transfer means for each of said element assemblers is selectively operable for alternately transferring assembled cell elements onto a plurality of said exit conveyor lanes.

47. The system of claim 46, in which each said element assembler includes an element assembly apparatus and an element transfer and processing apparatus; said element assembly apparatus including means for assembling battery cell elements having a plurality of electrode plates of alternating polarity separated by a continuous interleaved separator sheet; means for successively delivering assembled elements to a loading station at said element transfer and processing apparatus; said element transfer and processing apparatus including power driven conveyor means having a plurality of element carriers supported for movement along a defined path between said loading station and a discharge station; said carriers each having means for successively engaging an element at said loading station and carrying the engaged element for movement along said path; a plurality of processing stations located along said path for processing elements carried by said carriers during movement along said path; and said transfer means being operable to engage said processed elements at said discharge station.

48. The system of claim 44, including means for accumulating assembled elements in side-by-side relation on said exit conveyor lanes for subsequent movement in such relation on said exit conveyor.

* * * * *